US012519704B1

(12) United States Patent
Cheng et al.

(10) Patent No.: US 12,519,704 B1
(45) Date of Patent: Jan. 6, 2026

(54) SYSTEMS AND METHODS FOR WIRELINE DATA TRANSMISSION

(71) Applicant: Cable Television Laboratories, Inc., Louisville, CO (US)

(72) Inventors: Lin Cheng, Superior, CO (US); Luis Alberto Campos, Superior, CO (US); Thomas Sandholm, Mountain View, CA (US); Bernardo Huberman, Palo Alto, CA (US); Chris Stengrim, Wilton, CT (US); Randy Levensalor, Boulder, CO (US); Jonathan Ray Dennis, Aurora, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 158 days.

(21) Appl. No.: 17/468,614

(22) Filed: Sep. 7, 2021

Related U.S. Application Data

(60) Provisional application No. 63/238,858, filed on Aug. 31, 2021, provisional application No. 63/074,622, filed on Sep. 4, 2020.

(51) Int. Cl.
*H04L 41/34* (2022.01)
*H04W 24/02* (2009.01)
*H04W 74/08* (2009.01)
*H04W 84/12* (2009.01)

(52) U.S. Cl.
CPC ............. *H04L 41/34* (2022.05); *H04W 24/02* (2013.01); *H04W 74/08* (2013.01); *H04W 84/12* (2013.01)

(58) Field of Classification Search
CPC ...... H04L 41/12; H04W 24/02; H04W 74/08; H04W 84/12
See application file for complete search history.

(56) References Cited

U.S. PATENT DOCUMENTS

| 9,065,523 | B2 | 6/2015 | Campos et al. |
|---|---|---|---|
| 9,088,313 | B2 | 7/2015 | Campos et al. |
| 9,231,672 | B2 | 1/2016 | Campos et al. |
| 9,287,956 | B2 | 3/2016 | Campos et al. |
| 9,319,257 | B2 | 4/2016 | Campos et al. |
| 2004/0158649 | A1* | 8/2004 | Ophir ............... H04N 21/41265 709/250 |

(Continued)

OTHER PUBLICATIONS

Campos, Alberto and Cheng, Lin, "A 100-Gbps Coaxial Future," Mar. 2022.

(Continued)

*Primary Examiner* — Brian S Roberts
(74) *Attorney, Agent, or Firm* — PdZ Patent Law, PLLC

(57) ABSTRACT

A method for wireline data transmission includes (1) at a parent network node, generating first communication signals within a first frequency range, the first communication signals complying with a wireless data transmission protocol, (2) shifting frequency of the first communication signals from being within the first frequency range to being within a second frequency range, and (3) after shifting frequency of the first communication signals, sending the first communication signals from the parent network node to a first child network node via a first wireline communication link communicatively coupling the parent network node and the first child network node.

7 Claims, 14 Drawing Sheets

(56) References Cited

U.S. PATENT DOCUMENTS

| | | | |
|---|---|---|---|
| 2008/0092183 A1* | 4/2008 | Sorenson | H04N 21/2365 375/E7.002 |
| 2010/0064330 A1* | 3/2010 | Yu | H04L 27/0002 725/120 |
| 2020/0145710 A1* | 5/2020 | Poli | H04N 21/2221 |
| 2021/0250196 A1* | 8/2021 | Das | H04W 72/0453 |
| 2021/0336815 A1* | 10/2021 | Das | H04B 10/25751 |
| 2022/0279512 A1* | 9/2022 | Hoole | H04W 72/0453 |

OTHER PUBLICATIONS

Comcast, "Fifty Shades of Grey Optics: A Roadmap for Next Generation Access Networks," 2019.

M. Zhu, L. Zhang, J. Wang, L. Cheng, C.Liu, and G.Chang,"Radio-Over-Fiber Access Architecture for Integrated Broadband Wireless Services," in Journal of Lightwave Technology, vol. 31, No. 23, pp. 3614-3620, Dec. 1, 2013, doi: 10.1109/JLT.2013.2286564.

Y. Chen, G. Qian, and Y. Chen, "Modeling and simulation of broadband coaxial cable network for WIFI signal," 2016 EEE International Conference on Ubiquitous Wireless Broadband (ICUWB), Nanjing, 2016, pp. 1-4, doi: 10.1109/ICUWB.206.7790584.

"Assessment of LTE Based HFC Transport for Optimized Wireline/Wireless Convergence", L.A. Campos, J. Padden, I.K. Mun, McMillan, Sep. 2014.

* cited by examiner

SYSTEMS AND METHODS FOR WIRELINE DATA TRANSMISSION

RELATED APPLICATIONS

This application claims benefit of priority to (a) U.S. Provisional Patent Application Ser. No. 63/074,622, filed on Sep. 4, 2020, and (b) U.S. Provisional Patent Application Ser. No. 63/238,858, filed on Aug. 31, 2021. Each of the aforementioned patent applications is incorporated herein by reference.

BACKGROUND

Wireless communication networks are pervasive in modern society. For example, Wi-Fi wireless communication networks are commonly used for wireless data transmission within buildings and within vehicles, as well for data transmission over short distances outdoors. As another example, cellular wireless communication networks are commonly used to wirelessly transmit data over both long and short distances.

Communication networks are commonly modeled using an open systems interconnection (OSI) model, where each node in the network is represented by an OSI layer stack. The OSI layer stack makeup will vary among applications, but the layer stack typically includes at least some of the following layers in order from bottom to top, as illustrated in FIG. 1: (1) a physical layer 102, (2) a data link layer 104, (3) a network layer 106, (4) a transport layer 108, (5) a session layer 110, (6) a presentation layer 112, and (7) an application layer 114.

Physical (PHY) layer 102, also referred to as "layer 1," facilitates transfer of data symbols across a physical communication medium, such as by defining interfaces with the communication medium, controlling bit rate, controlling synchronization, etc. Data link layer 104, also referred to as "layer 2," may encode transmission entities received from upper layers into bits for the physical layer. Additionally, data link layer 104 may decode bits received from the physical layer into transmission entities for upper layers. Furthermore, data link layer 104 may provide transmission protocol and management, frame synchronization, and flow control. Data link layer 104 often includes two sublayers, i.e., a medium access control (MAC) sublayer 116 and a logical link control (LLC) sublayer 118. MAC sublayer 116 provides flow control and multiplexing for a transmission medium, and LLC sublayer 118 provides flow control and multiplexing for a logical link. MAC sublayer 116 sometimes includes two constituent elements (not shown), i.e., an upper MAC and a lower MAC. The upper MAC interacts with LLC sublayer 118, and the lower MAC interacts with PHY layer 102. Network layer 106, also referred to as "layer 3," provides switching and routing, and transport layer 108, also referred to as "layer 4," helps ensure complete data transfer. Session layer 110, also referred to as "layer 5," controls connections between applications, and presentation layer 112, also referred to as "layer 6," translates between an application format and a network format. Finally, application layer 114, also referred to as "layer 7," supports application processes.

As one example of network operation according to the OSI model, consider a network where device A sends data to device B over a communication medium C. At device A, data travels down device A's OSI layer stack from its application layer to its physical layer. The data then travels from device A's physical layer to device B's physical layer via communication medium C, and the data then travels up device B's OSI layer stack from its physical layer to its application layer.

DETAILED DESCRIPTION OF THE EMBODIMENTS

Disclosed herein are systems and methods for wireline data transmission which significantly advance the state of the art. The new systems and methods transmit data via one or more wireline communication links, such as embodied by electrical cables and/or optical cables, using one or more wireless data transmission protocols. Examples of possible wireless data transmission protocols used by the new systems and methods include, but are not limited to, a Wi-Fi data transmission protocol (e.g., an Institute of Electrical Electronics Engineers (IEEE) 802.11-based data transmission protocol), a long term evolution (LTE) cellular data transmission protocol, a fifth generation (5G) new radio (NR) cellular data transmission protocol, a sixth generation (6G) cellular data transmission protocol, a Bluetooth data transmission protocol, a satellite data transmission protocol, and extensions, variations, or successors of any of the foregoing data transmission protocols.

Figure 1:
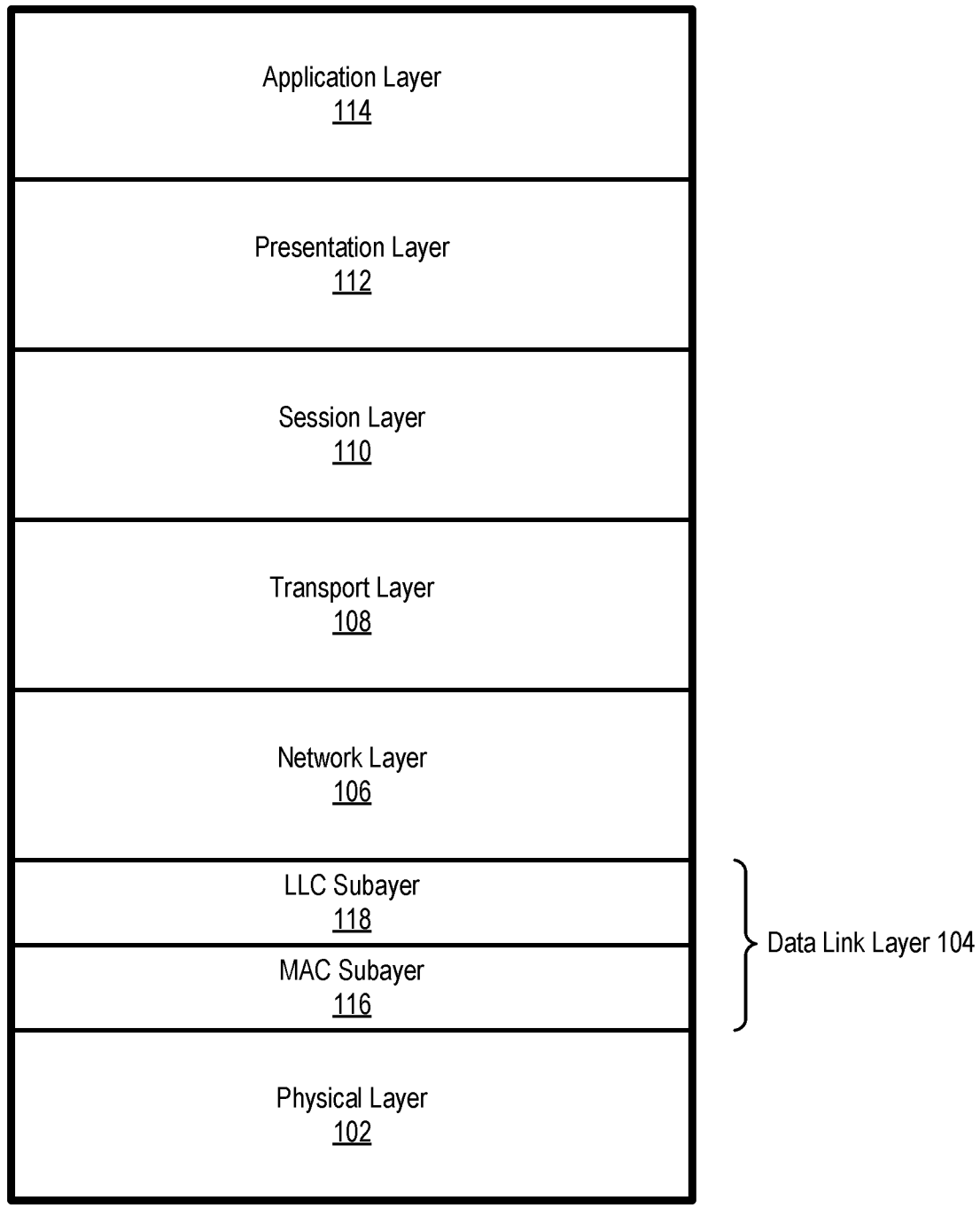
FIG. 1 is an illustration of a prior art open systems interconnection (OSI) model layer stack.
Figure 2:
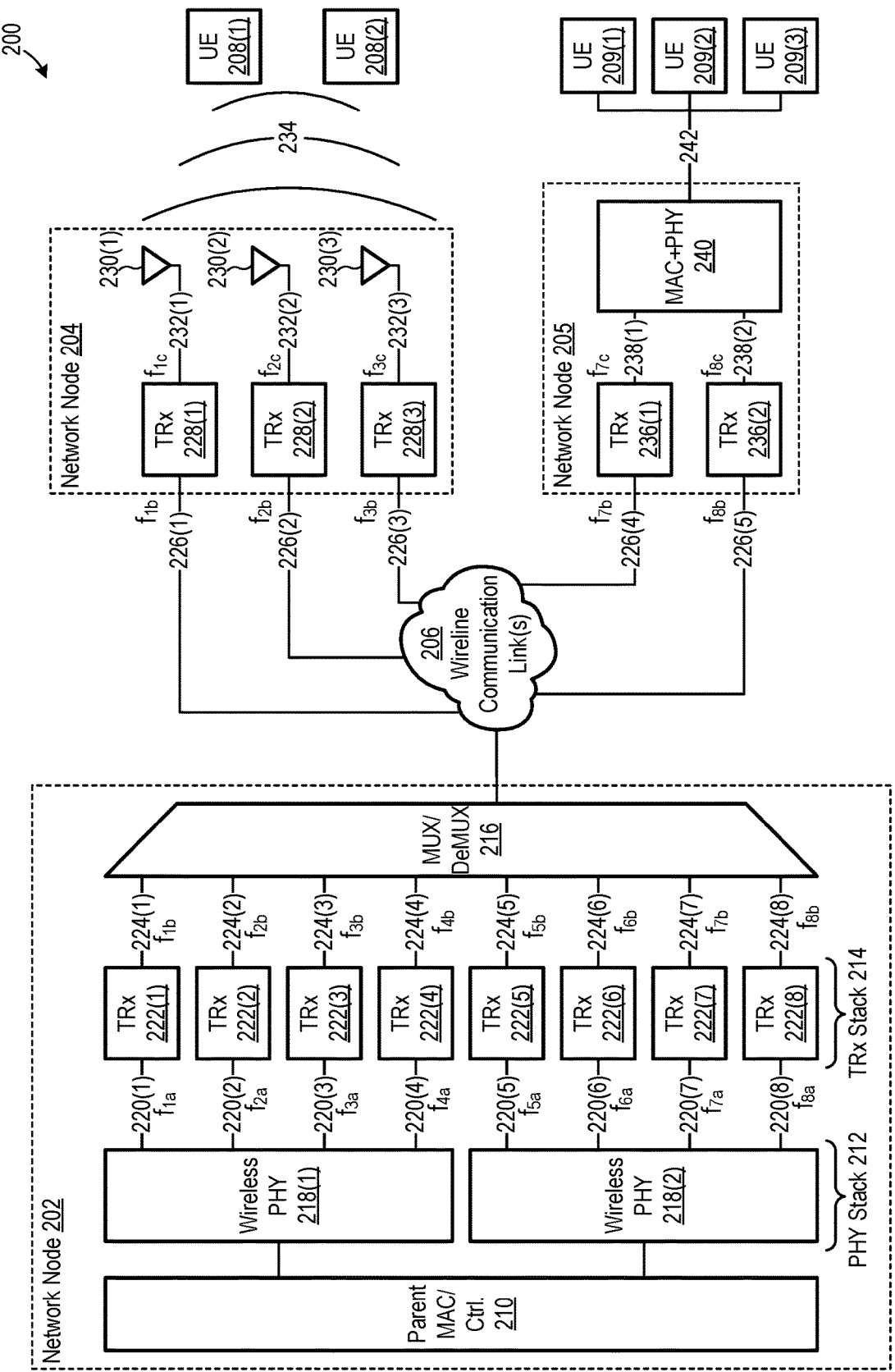
FIG. 2 is a block diagram of a wireline communication network configured to transmit data though a wireline communication link according to a wireless data transmission protocol.

FIG. 2 is a block diagram of a wireline communication network 200, which is one embodiment of the new systems for wireline data transmission. Wireline communication network 200 includes a parent network node 202, a child network node 204, a child network node 205, and one or more wireline communication links 206. FIG. 2 additionally illustrates user equipment (UE) devices 208 and 209, although UE devices 208 and 209 are not necessarily part of wireline communication network 200. In this document, specific instances of an item may be referred to by use of a numeral in parentheses (e.g. UE device 208(1)) while numerals without parentheses refer to any such item (e.g. UE devices 208).

Wireline communication network 200 is configured to transmit data between parent network node 202 and plurality of child network nodes, such as child network nodes 204 and 205. Accordingly, wireless communication network 200 has a point-to-multipoint topology. Although FIG. 2 illustrates wireline communication network 200 as including only two child network nodes 204 and 205 for illustrative clarity, wireline communication network 200 can (and usually will) include additional child network nodes. For example, some embodiments of wireline communication network 200 include tens, hundreds, or even thousands of child network nodes. Some alternate embodiments of wireline communication network 200, however, include only a single child network node, such that the network has a point-to-point, instead of a point-to-multipoint, topology.

Parent network node 202 includes a parent medium access control (MAC) sublayer/controller 210, a physical (PHY) layer stack 212, a transceiver (TRx) stack 214, and a multiplexer/demultiplexer (MUX/DeMUX) 216. MUX/DeMUX 216 could alternately be a power combiner/splitter. Element 216 will henceforth be referred to solely as MUX/DeMUX 216 for brevity, but it is understood that any instance of MUX/DeMUX 216 in this document and the accompanying drawings could alternately be a power combiner/splitter. While not required, parent network node 202 typically includes additional elements, such as to support additional OSI stack layers, but these additional elements are not shown in FIG. 2 for illustrative clarity. The elements of parent network node 202 are implemented, for example, by analog electronic circuitry, digital electronic circuitry, and/or optical elements. For example, in particular embodiments, the elements of parent network node 202 are at least partially implemented by purpose-built physical devices, such as application-specific integrated circuits (ASICs). As another example, in certain embodiments, the elements of parent network node 202 are software based, virtualized, and/or cloud native. For example, in some embodiments, one or more elements of parent network node 202 are at least partially implemented by a processing subsystem (not shown) and a storage subsystem (not shown), where the processing subsystem is configured to execute instructions, such as software and/or firmware, stored in the storage subsystem, to perform functions of parent network node 202. Two or more elements of parent network node 202 could be combined, and one or more elements of parent network node 202 could be formed of two or more constituent sub-elements. In some embodiments, parent network node 202 is a remote PHY device (RPD).

PHY layer stack 212 includes one or more wireless PHY subsystems 218, where the number of wireless PHY subsystems 218 is implementation dependent. Each wireless PHY subsystem 218 need not have the same configuration. Each wireless PHY subsystem 218 includes one or more PHY channels 220. While FIG. 2 depicts each wireless PHY subsystem 218 as including four PHY channels 220, the number of PHY channels 220 of each wireless PHY subsystem 218 may vary, and two or more wireless PHY subsystems 218 may have different numbers of respective PHY channels 220. In some embodiments, wireless PHY subsystems 218 are implemented by one or more integrated circuits intended for use in wireless communication networks, where each PHY channel 220 is intended for coupling to a respective antenna. Parent MAC/controller 210 is configured to serve as a MAC sublayer for each wireless PHY subsystem 218. Parent MAC/controller 210 is also configured to control aspects of parent network node 202, as discussed below.

Each wireless PHY subsystem 218 is configured to generate and receive respective communication signals on each of its respective PHY channels 220, where the communication signals comply with a wireless data transmission protocol. Examples of the wireless data transmission protocol include, but are not limited to, a Wi-Fi data transmission protocol, a LTE cellular data transmission protocol, a 5G NR cellular data transmission protocol, a 6G cellular data transmission protocol, a Bluetooth data transmission protocol, a satellite data transmission protocol. Additionally, the wireless data transmission protocol could be an extension, variation, or successor of any of the foregoing data transmission protocols. For example, Applicant has determined that it may be advantageous in certain applications to modify a conventional wireless data transmission protocol to create a custom data transmission protocol, as discussed below. The wireless data transmission protocol could vary among instances of wireless PHY subsystems 218. For example, wireless PHY subsystem 218(1) could be configured to generate and receive communication signals complying with one Wi-Fi data transmission protocol, and wireless PHY subsystem 218(2) could be configured to generate and receive communication signals complying with another Wi-Fi data transmission protocol.

The communication signals on PHY channels 220(1)-220(8) are within respective frequency ranges $f_{1a}$-$f_{8a}$. While not required, it is anticipated that for a given wireless PHY subsystem 218, communication signal frequency range will differ among PHY channels 220. For example, frequency range $f_{2a}$ of PHY channel 220(2) may be different from frequency range $f_{1a}$ of PHY channel 220(1). On the other hand, communication signal frequency range may be the same on two PHY channels 220, such as two PHY channel 220 of different respective wireless PHY subsystems 218. For example, assume that wireless PHY subsystems 218(1) and 218(2) have the same configuration. In this example embodiment, communication signals on the respective first channel of each wireless PHY subsystem 218, i.e., channels 220(1) and 220(5), may be within a common frequency range.

TRx stack 214 includes a respective TRx 222 for each PHY channel 220. Each TRx 222 is configured to interface a respective PHY channel 220 with a respective transmission channel 224 by shifting communication signal frequency range. Specifically, TRxs 222(1)-222(8) are configured to shift communication signals within respective frequency ranges $f_{1a}$-$f_{8a}$ to be within respective frequency ranges $f_{1b}$-$f_{8b}$, and vice versa. For example, TRx 222(1) is configured to interface PHY channel 220(1) with transmission channel 224(1) by shifting frequency range of communication signals from $f_{1a}$ on PHY channel 220(1) to $f_{1b}$ on transmission channel 224(1), and vice versa. As another example, TRx 222(2) is configured to interface PHY channel 220(2) with transmission channel 224(2) by shifting frequency range of communication signals from $f_{2a}$ on PHY channel 220(2) to $f_{2b}$ on transmission channel 224(2), and vice versa. As an additional example, a TRx 222 may be configured to upconvert a communication signal stream from a baseband frequency range to a first radio frequency (RF) frequency range for cable network transmission.

While not required, communication signal frequency ranges will typically be different on each transmission channel 224 to enable all communication signals to be transmitted without interference on a common physical wireline communication medium. In embodiments where wireline communication links 206 include two or more parallel physical wireline communication mediums, communication signal frequency ranges may be the same on two or more transmission channels 224. In some embodiments, such as where one or more channels are dedicated to either uplink or downlink (discussed below), one or more TRx 222 instances are configured to shift frequency in only a single direction, e.g., solely from frequency range $f_{1a}$ to $f_{1b}$ or solely from frequency range $f_{1b}$ to $f_{1a}$.

MUX/DeMUX 216 is configured to couple respective communication signals of transmission channels 224 onto a common physical wireline communication medium of wireline communication link(s) 206, such as a common electrical cable or a common optical cable. MUX/DeMUX 216 is also configured to couple communication signals on the common physical wireline communication medium to an approximate transmission channel 224. For example, MUX/DeMUX 216 may couple communication signals on wireline communication link(s) 206 in frequency range $f_{1b}$ to communication channel 224(1), and MUX/DeMUX 216 may couple communication signals on wireline communication link(s) 206 in frequency range $f_{2b}$ to communication channel 224(2). MUX/DeMUX 216 may be omitted in embodiments where wireline communication link(s) 206 include a respective physical wireline communication medium for each transmission channel 224.

Wireline communication link(s) 206 communicatively couple parent network node 202 and each child network node 204 and 205. FIG. 2 illustrates wireline communication link(s) 206 as forming five logical wireline communication links 226(1)-226(5), although the number of logical wireline communication links 226 will depend on the number and configuration of child network nodes. Logical wireline communication links 226 do not necessarily correspond to separate physical wireline communication links. For example, in certain embodiments, all logical wireline communication links 226 are embodied by a single physical wireline communication link.

In some embodiments, wireline communication link(s) 206 include one or more electrical cables, such as one or more coaxial electrical cables, one more twisted pair electrical cables (e.g., Ethernet electrical cables or telephone electrical cables), and/or one or more powerline electrical cables. In particular embodiments, wireline communication link(s) 206 include one or more optical cables. Additionally, wireline communication link(s) 206 may include a combination of optical and electrical cables, such as a combination of optical cables and coaxial electrical cables or a combination of optical cables and twisted pair electrical cables. Wireline communication links 206 may also include active and/or passive interface devices, such as fiber nodes, remote terminals, amplifiers, repeaters, splitters, taps, power inserters, etc. Several examples of possible implementations of wireline communication link(s) 206 are discussed below with respect to FIGS. 7 and 8

Child network node 204 is illustrated as including three TRx instances 228(1)-228(3), although the number of TRx instances 228 of child network node 204 may vary without departing from the scope hereof. Each TRx 228 is configured to interface a respective logical wireline communication link 226 with a respective antenna channel 232 by shifting communication signal frequency range. Specifically, TRxs 228(1)-228(3) are configured to shift communication signals in respective frequency ranges $f_{1b}$-$f_{3b}$ to respective frequency ranges $f_{1c}$-$f_{3c}$, and vice versa. For example, TRx 228(1) is configured to interface logical wireline communication link 226(1) with antenna channel 232(1) by shifting frequency range of communication signals from $f_{1b}$ on logical wireline communication link 226(1) to $f_{1c}$ on antenna channel 232(1), and vice versa. As another example, TRx 228(2) is configured to interface logical wireline communication link 226(2) with antenna channel 232(2) by shifting frequency of communication signals from $f_{2b}$ on logical wireline communication link 226(2) to $f_{2c}$ on antenna channel 232(2), and vice versa.

Child network node 204 further includes a respective antenna 230 communicatively coupled to each antenna channel 232. Each antenna 230 is configured to convert communication signals on its antenna channel 232, which are in either an electrical domain or an optical domain, to radio-frequency wireless communication signals 234. Additionally, each antenna 230 is configured to convert radio frequency wireless signals (not shown) from UE devices 208 to communication signals in an electrical domain or an optical domain on its respective antenna channel 232. FIG. 2 illustrates two UE devices 208(1) and 208(2) being served by child network node 204, although the number of UE devices 208 being served by child network node 204 may vary. Examples of UE devices 208(1) and 208(2) include, but are not limited to, a mobile telephone, a computer, a set-top device, a data storage device, an Internet of Things (IoT) device, an entertainment device, a computer networking device, a smartwatch, a wearable device with wireless capability, a medical device, a security device, a monitoring device, and a wireless access device (including, for example, an eNB, a gNB, a Wi-Fi-based wireless access point, an IAB access point, a microcell, a picocell, a femtocell, a macrocell, a Wi-Fi-based application, a satellite communication device, etc). In certain embodiments where communication signals on PHY channels 220(1) and 220(2) comply with a Wi-Fi data transmission protocol, UE devices 208(1) and 208(2) are communicatively coupled to parent network node 202 via a direct Wi-Fi connection between UE devices 208(1) and 208(2) and parent network node 202.

Radio frequency wireless communication signals 234 comply with the same wireless data transmission protocol(s) as communication signals on PHY channels 220. For example, if communication signals on PHY channels 220 comply with a Wi-Fi data transmission protocol, radio frequency wireless communication signals 234 will comply with the same Wi-Fi data transmission protocol. As another example, if communication signals on PHY channels 220 comply with a cellular data transmission protocol, radio frequency wireless communication signals 234 will comply with the same cellular data transmission protocol. Thus, child network node 204 is configured to function as a wireless access point. It should be appreciated that child network node 204 is relatively simple, which promotes low cost and small size of the child network node. Additionally, child network node 204 can potentially be located a long distance from parent network node 202, depending on distance limitations of wireline communication link(s) 206. Accordingly, one or more instances of child network node 204 can be used in communication network 200 to provide wireless communication service in locations remote from parent network node 202, such as in buildings or outdoors, at a relatively low cost and with minimal hardware. For example, one child network node 204 instance could be embodied as customer premises equipment (CPE) that is placed in a building to provide private wireless communication services in the building, and another child network node 204 instance could be placed outside on a utility pole or other structure to provide public and/or private wireless communication service outdoors.

Child network 205 is embodied as CPE and is illustrated as including two TRx instances 236(1) and 236(2), although the number of TRx instances 236 of child network node 205. Each TRx 236 is configured to interface a respective logical wireline communication link 226 with a respective CPE channel 238 by shifting communication signal frequency range. For example, TRx 236(1) is configured to interface logical wireline communication link 226(4) with CPE channel 238(1) by shifting communication signal frequency range from $f_{7b}$ on logical wireline communication link 226(4) to $f_{7c}$ on CPE channel 232(1), and vice versa. As another example, TRx 236(2) is configured to interface logical wireline communication link 226(5) with CPE channel 238(2) by shifting communication signal frequency range from $f_{8b}$ on logical wireline communication link 226(5) to $f_{8c}$ on CPE channel 238(2), and vice versa.

Communication signals on CPE channels 238 comply with the same wireless data transmission protocol(s) as communication signals on PHY channels 220. For example, if communication signals on PHY channels 220 comply with a Wi-Fi data transmission protocol, communication signals on CPE channels 238 will comply with the same Wi-Fi data transmission protocol. Child network node 205 further includes a MAC plus PHY (MAC+PHY) 240 configured to interface CPE channels 238(1) and 283(2) with a local area network (LAN) 242. Specifically, MAC+PHY 240 is configured to convert communication signals on CPE channels 238 having a first data transmission protocol, i.e., a wireless data transmission protocol of one of more wireless PHY subsystems 218, to a different transmission protocol of LAN 242, and vice versa. Examples of possible data transmission protocols of LAN 242 include, but are not limited to, an IEEE 802.3-based data transmission protocol, a powerline networking data transmission protocol, a home networking data transmission protocol (e.g., a Multi-Media over Coax (MoCA) data transmission protocol or a HomePNA (G.hn) data transmission protocol), and a wireless data transmission protocol (e.g., a Wi-Fi data transmission protocol, a cellular data transmission protocol, or a Bluetooth data transmission protocol).

LAN 242 communicatively couples UE devices 209 with MAC+PHY 240, and LAN 242 includes, for example, a wired LAN and/or a wireless LAN. Although FIG. 2 illustrates three UE devices 209 being served by child network node 205, the number of UE devices 209 being served by child network node 205 may vary. Examples of UE devices 209 include, but are not limited to, a mobile telephone, a computer, a set-top device, a data storage device, an Internet of Things (IoT) device, an entertainment device, a computer networking device, a smartwatch, a wearable device with wireless capability, a medical device, a security device, a monitoring device, and a wireless access device (including, for example, an eNB, a gNB, a Wi-Fi-based wireless access point, an IAB access point, a microcell, a picocell, a femtocell, a macrocell, a Wi-Fi-based application, a satellite communication device, etc).

Figure 3:
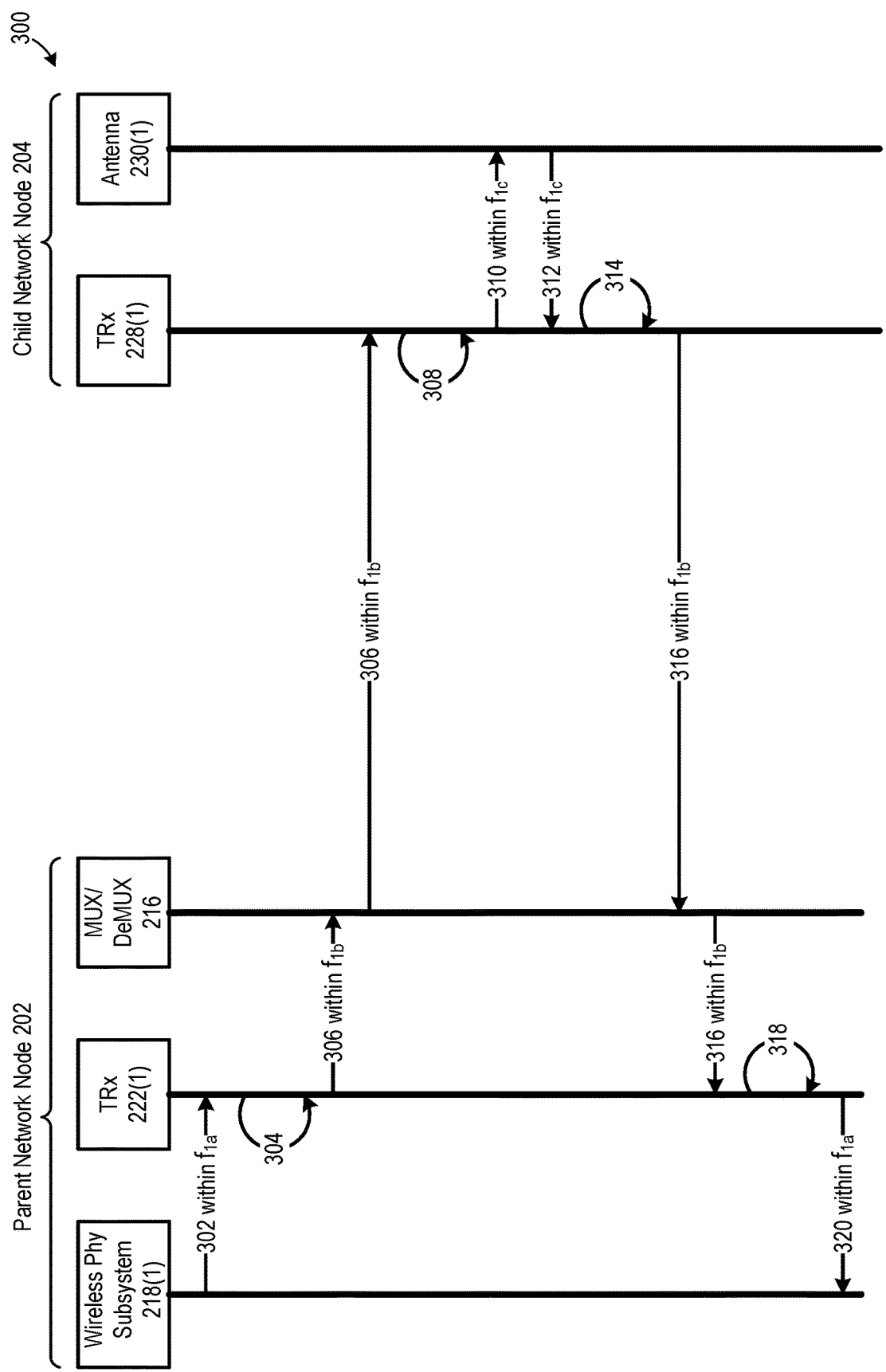
FIG. 3 is a dataflow diagram illustrating one example of operation of the FIG. 2 wireline communication network.
Figure 4:
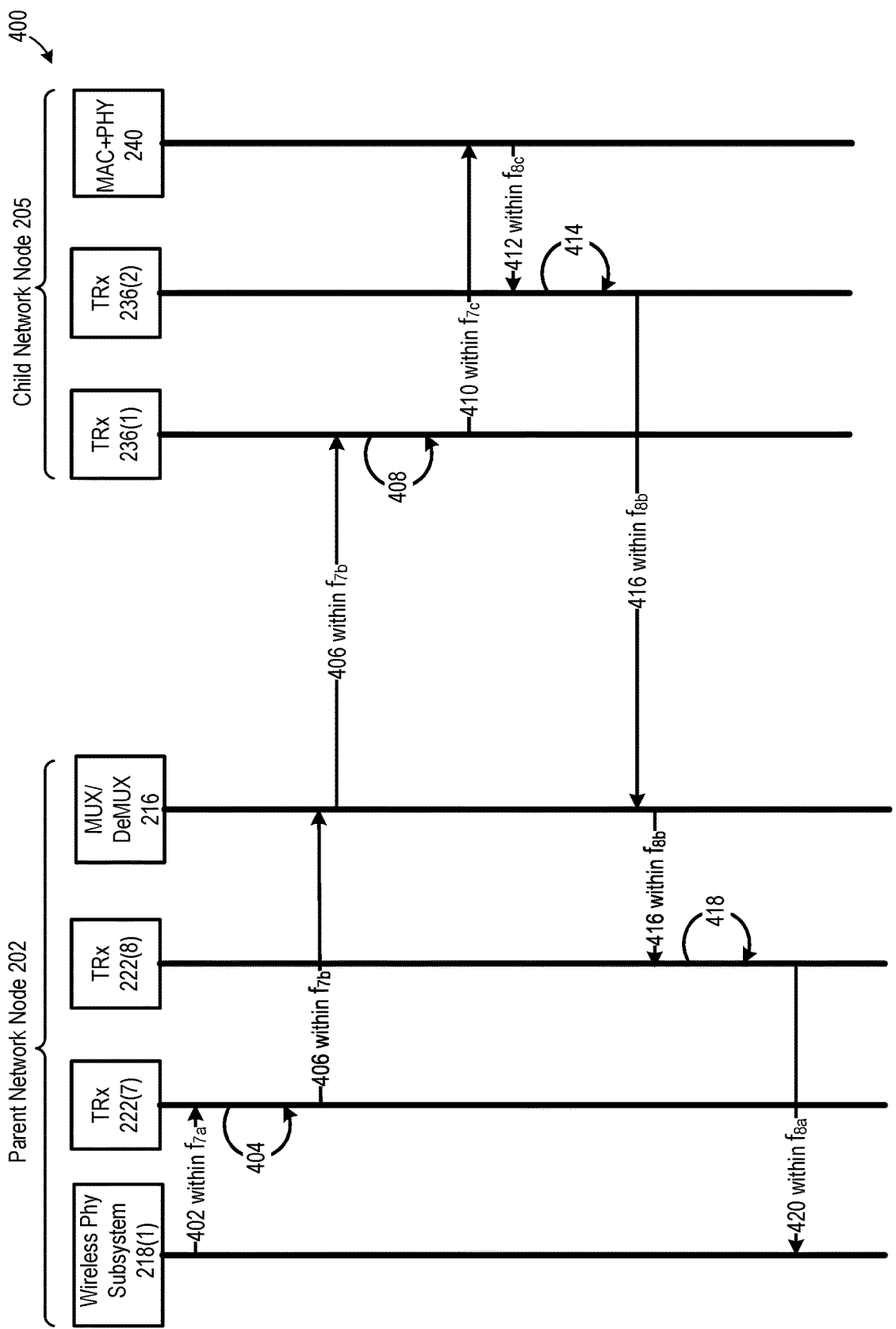
FIG. 4 is a dataflow diagram illustrating another example of operation of the FIG. 2 wireline communication network.

FIGS. 3 and 4 are dataflow diagrams illustrating respective operating examples of communication network 200. It is understood, however, that communication network 200 is not limited to operating according to these examples.

FIG. 3 is a dataflow diagram 300 illustrating an example of (a) transfer of downlink data from parent network node 202 to child network node 204 and (b) transfer of uplink data from child network node 204 to parent network node 202. FIG. 3 is best viewed together with FIG. 2. Dataflow diagram 300 includes vertical lines logically representing each of wireless PHY subsystem 218(1), TRx 222(1), MUX/DeMUX 216, TRx 228(1), and antenna 230(1). Other elements of communication network 200 are not shown in FIG. 3.

Communication network 200 performs downlink data transmission in the FIG. 3 example as follows. First, wireless PHY subsystem 218(1) generates first downlink communication signals 302 within frequency range $f_{1a}$ on PHY channel 220(1), where first downlink communication signals 302 comply with a wireless data transmission protocol. TRx 222(1) next shifts 304 frequency range of first downlink communication signals 302 from $f_{1a}$ to $f_{1b}$, to generate first downlink communication signals 306 on transmission channel 224(1). MUX/DeMUX 216 couples first downlink communication signals 306 onto a cable implementing logical communication link 226(1), and logical communication link 226(1) transmits first downlink communication signals 306 from parent network node 202 to first child network node 204. TRx 228(1) at first child network node 204 shifts 308 frequency range of first downlink communication signals 306 from $f_{1b}$ to $f_{1c}$, to generate first downlink communication signals 310 on antenna channel 232(1). Antenna 230(1) converts first downlink communication signals 310 from an electrical or optical domain to a radio-frequency domain, to generate wireless communication signals 234.

Communication network 200 performs uplink data transmission in the FIG. 3 example as follows. First, antenna 230(1) converts wireless communication signals (not shown in FIG. 2 or 3) from UE 208(1) or 208(2) to the electrical domain or to the optical domain, to generate first uplink communication signals 312 within frequency range $f_{1c}$, where first uplink communication signals 312 comply with a wireless data transmission protocol. TRx 228(1) next shifts 314 frequency range of first uplink communication signals 312 from $f_{1c}$ to $f_{1b}$, to generate first uplink communication signals 316 on logical communication link 226(1). Logical communication link 226(1) transmits first uplink communication signals 316 from first child network node 204 to parent network node 202. MUX/DeMUX 216 next couples first uplink communication signals 316 from the cable implementing logical communication link 226(1) to transmission channel 224(1). TRx 222(1) next shifts 318 frequency range of first uplink communication signals 316 from $f_{1b}$ to $f_{1a}$, to generate first uplink communication signals 320 on PHY channel 220(1), which are received by wireless PHY subsystem 218(1).

FIG. 4 is a dataflow diagram 400 illustrating an example of (a) transfer of downlink data from parent network node 202 to child network node 205 and (b) transfer of uplink data from child network node 205 to parent network node 202. FIG. 4 is best viewed together with FIG. 2. Dataflow diagram 300 includes vertical lines logically representing each of wireless PHY subsystem 218(1), TRx 222(7), TRx 222(8), MUX/DeMUX 216, TRx 236(1), TRx 236(2), and MAC+PHY 240. Other elements of communication network 200 are not shown in FIG. 4. Communication network 200 is configured in the FIG. 4 example such that (a) PHY channel 220(7) is dedicated to downlink data transmission from parent network node 202 to second child node 205, and (b) PHY channel 220(8) is dedicated to uplink data transmission from second child node 205 to parent network node 202. Accordingly, logical communication link 226(4) handles solely downlink data transmission from parent network node 202 to second child network node 205, and logical communication link 226(5) handles solely uplink data transmission from second child network node 205 to parent network node 202. Such use of dedicated logical communication links for uplink and downlink communication signals advantageously eliminates possibility of collision between uplink and downlink communication signals.

Communication network 200 performs downlink data transmission in the FIG. 4 example as follows. First, wireless PHY subsystem 218(2) generates first downlink communication signals 402 within frequency range $f_{7a}$ on PHY channel 220(7), where first downlink communication signals 402 comply with a wireless data transmission protocol. TRx 222(7) next shifts 404 frequency range of first downlink communication signals 402 from $f_{7a}$ to $f_{7b}$ to generate first downlink communication signals 406 on transmission channel 224(4). MUX/DeMUX 216 couples first downlink communication signals 406 onto a cable implementing logical communication links 226(4) and 226(5), and logical communication link 226(4) transmits first downlink communication signals 406 from parent network node 202 to second child network node 205. TRx 236(1) at second child network node 205 shifts 408 frequency range of first downlink communication signals 406 from $f_{7b}$ to $f_{7c}$, to generate first downlink communication signals 410 on CPE channel 238 (1), and MAC+PHY 240 receives first downlink communication signals 410.

Communication network 200 performs uplink data transmission in the FIG. 4 example as follows. First, MAC+PHY 240 generates first uplink communication signals 412 within frequency range $f_{8c}$, where first uplink communication signals 412 comply with a wireless data transmission protocol. TRx 236(2) next shifts 414 frequency range of first uplink communication signals 412 from $f_{8c}$ to $f_{8b}$, to generate first uplink communication signals 416 on logical communication channel 226(5). Logical communication link 226(5) transmits first uplink communication signals 416 from second child network node 205 to parent network node 202. MUX/DeMUX 216 next couples first uplink communication signals 416 from the cable implementing logical communication links 226(4) and 226(5) to transmission channel 224(8). TRx 222(8) next shifts 418 frequency range of first uplink communication signals 416 from $f_{8b}$ to $f_{8a}$, to generate first uplink communication signals 420 on PHY channel 220(8), which are received by wireless PHY subsystem 218(2).

Referring again to FIG. 2, it should be appreciated that while communication network 200 transmits communication signals complying with one or more wireless data transmission protocols, the communication signals are transmitted via wireline communication link(s) 206, instead of wireless communication links. Use of wireline communication links to transmit the communication signals in communication network 200 advantageously helps minimize possibility of the communication signals being subjected to interference, as well helps minimize possibility of the communication signals causing interference with other communication networks. Additionally, use wireline communication links to transmit the communication signals in communication network 200 may enable use of wider data transmission channels than would be possible with wireless communication links.

Parent MAC/controller 210 is configured to control aspects of parent network node 202, as well as serve as a MAC sublayer for parent network node 202. For example, some embodiments of parent MAC/controller 210 are configured to control transceivers 222 of TRx stack 214 to coordinate frequency ranges of communication signals on transmission channels 224, such as to ensure that there is no overlap of the frequency ranges and/or to ensure that the frequency ranges do not overlap with any other communication signals which might be present on wireline communication link(s) 206. As another example, certain embodiments of MAC/controller 210 are configured to control parameters of wireless PHY subsystems 218. For instance, in embodiments where wireless PHY subsystems 218 are Wi-Fi PHY subsystems, MAC/controller 210 is optionally configured to control one or more Wi-Fi parameters, such as to optimize PHY channels 220 for child network nodes.

Furthermore, some embodiments of parent MAC/controller 210 are configured to allocate PHY channels 220 among child network nodes. For example, all PHY channels 220 of a given wireless PHY subsystem 218 may be allocated to a single child network node, or PHY channels 220 of a given wireless PHY subsystem 218 may be split among two or more child network nodes. Additionally, a given child network node may be allocated PHY channels 220 of two or more different wireless PHY subsystems 218. Moreover, a given PHY channel 220 may be shared by two or more child network nodes, such as by using time division multiplexing and/or frequency division multiplexing.

Figure 5:
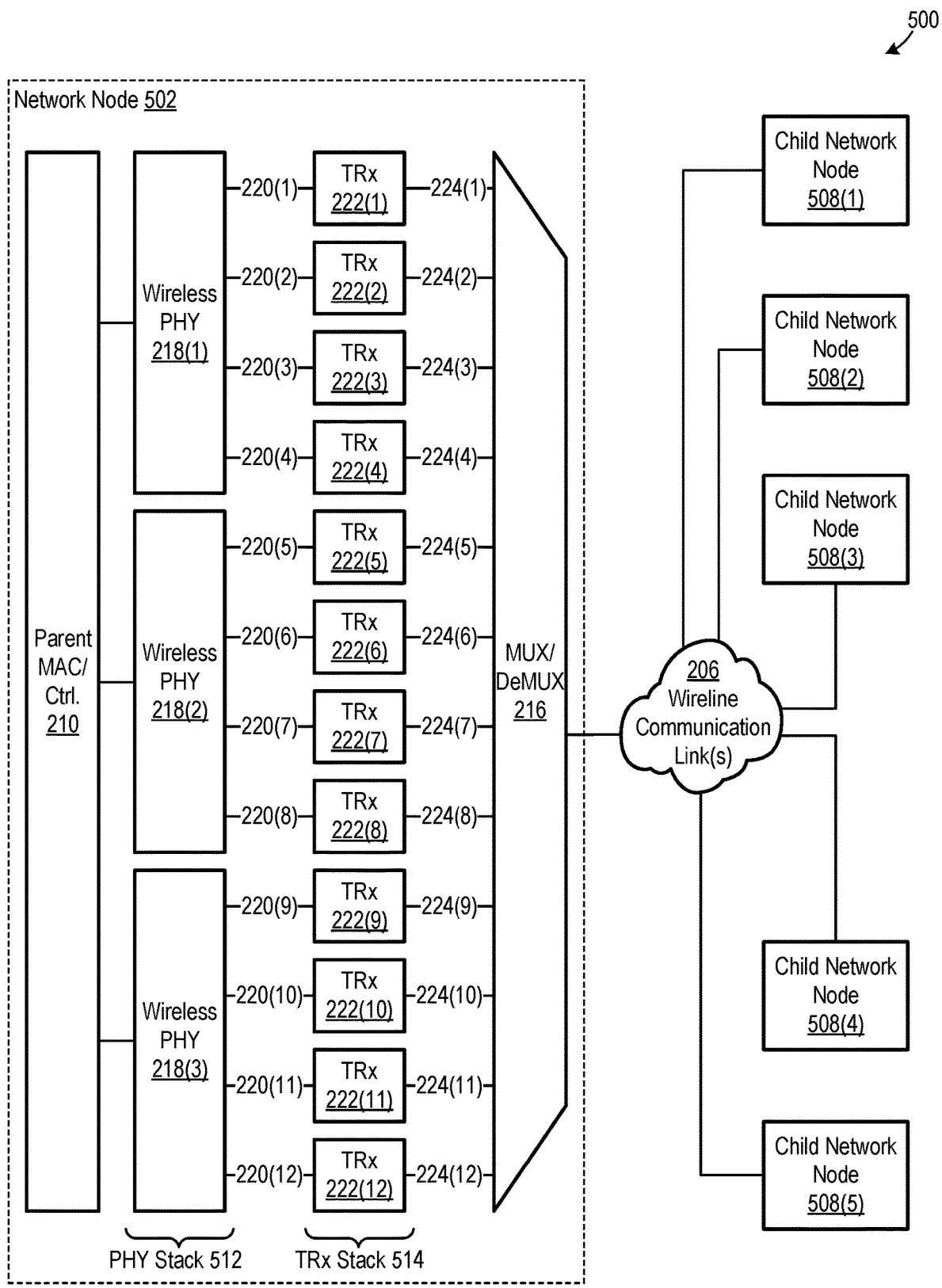
FIG. 5 is block diagram of an alternate embodiment of the FIG. 2 communication network.

As one example of how PHY channels 220 could be allocated among child network nodes, consider wireline communication network 500 of FIG. 5, which is an alternate embodiment of wireline communication network 200 of FIG. 2. Communication network 500 includes a parent network node 502 in place of parent network node 202, as well as five child network nodes 508 in place of child network nodes 204 and 205. Parent network node 502 differs from parent network node 202 solely in number of wireless PHY subsystems 218 and transceivers 222. Specifically, parent network node 502 includes a PHY layer stack 512 including three instances of wireless PHY subsystems 218 as well as a TRx stack 514 including twelve instances of transceivers 514. Details of child network nodes 508 are not shown for illustrative clarity, but in some embodiments, one or more child network nodes 508 are configured similar to child network node 204 or child network node 205.

Figure 6:
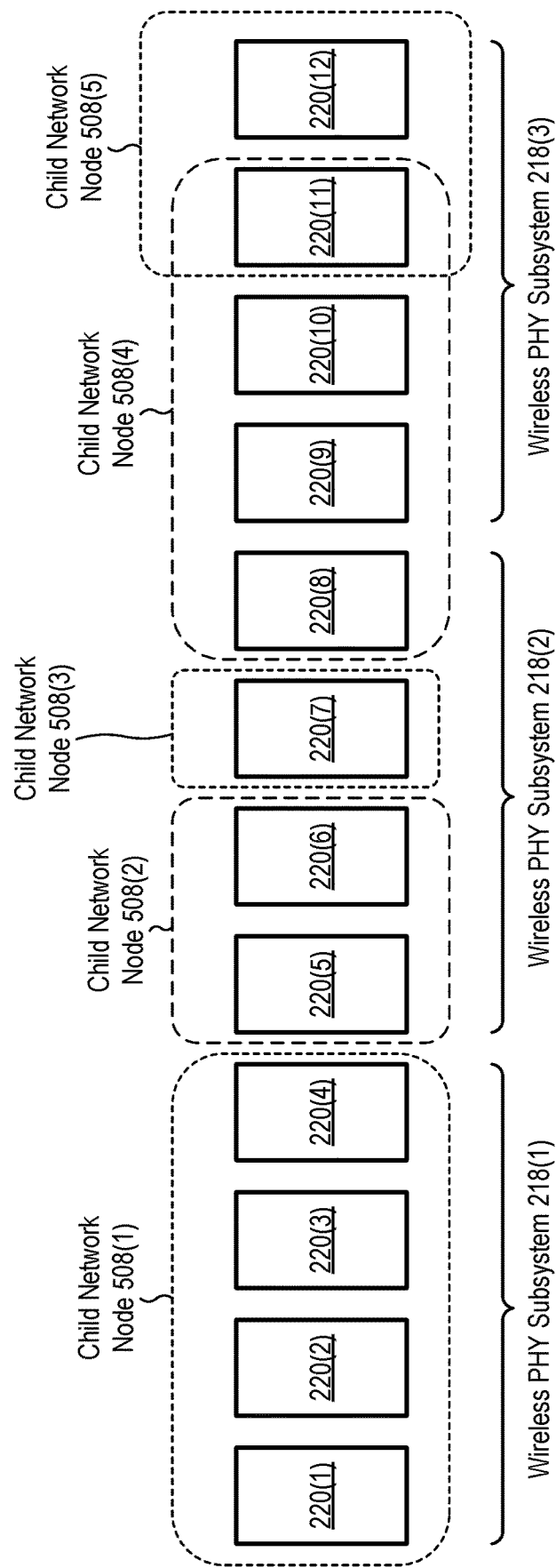
FIG. 6 is an illustration of one example of how physical layer channels could be allocated among child network nodes of the FIG. 5 communication network.

FIG. 6 is an illustration of one example of allocation of PHY channels 220 among child network nodes 508 in wireline communication network 500 of FIG. 5. FIG. 6 includes a respective box for each PHY channel 220 of communication network 500, and FIG. 6 further includes a respective dashed-line box encompassing the PHY channels 220 allocated to each child network node 508. As illustrated in FIG. 6, all PHY channels 220, i.e., PHY channels 220 (1)-200(4) of wireless PHY subsystem 218(1) are allocated to child network node 508(1). PHY channels 220(5)-220(8) of wireless PHY subsystem 218(2), in contrast, are allocated to three different child network nodes 508. Specifically, PHY channels 220(5) and 220(6) are allocated to child network node 508(2), PHY channel 220(7) is allocated to child network node 508(3), and PHY channel 220(8) is allocated to child network node 508(4). Child network node 508(4) is also allocated PHY channels 220(9)-220(11) of wireless PHY subsystem 218(3), such that child network node 508(4) is served by two different wireless PHY subsystems 218. Child network node 508(5), in turn, is allocated PHY channels 220(11) and 220(12) of wireless PHY subsystem 218(3). Accordingly, PHY channel 220(11) is shared by child network nodes 508(4) and 508(5), such as by using time division multiplexing and/or frequency division multiplexing.

Figure 7:
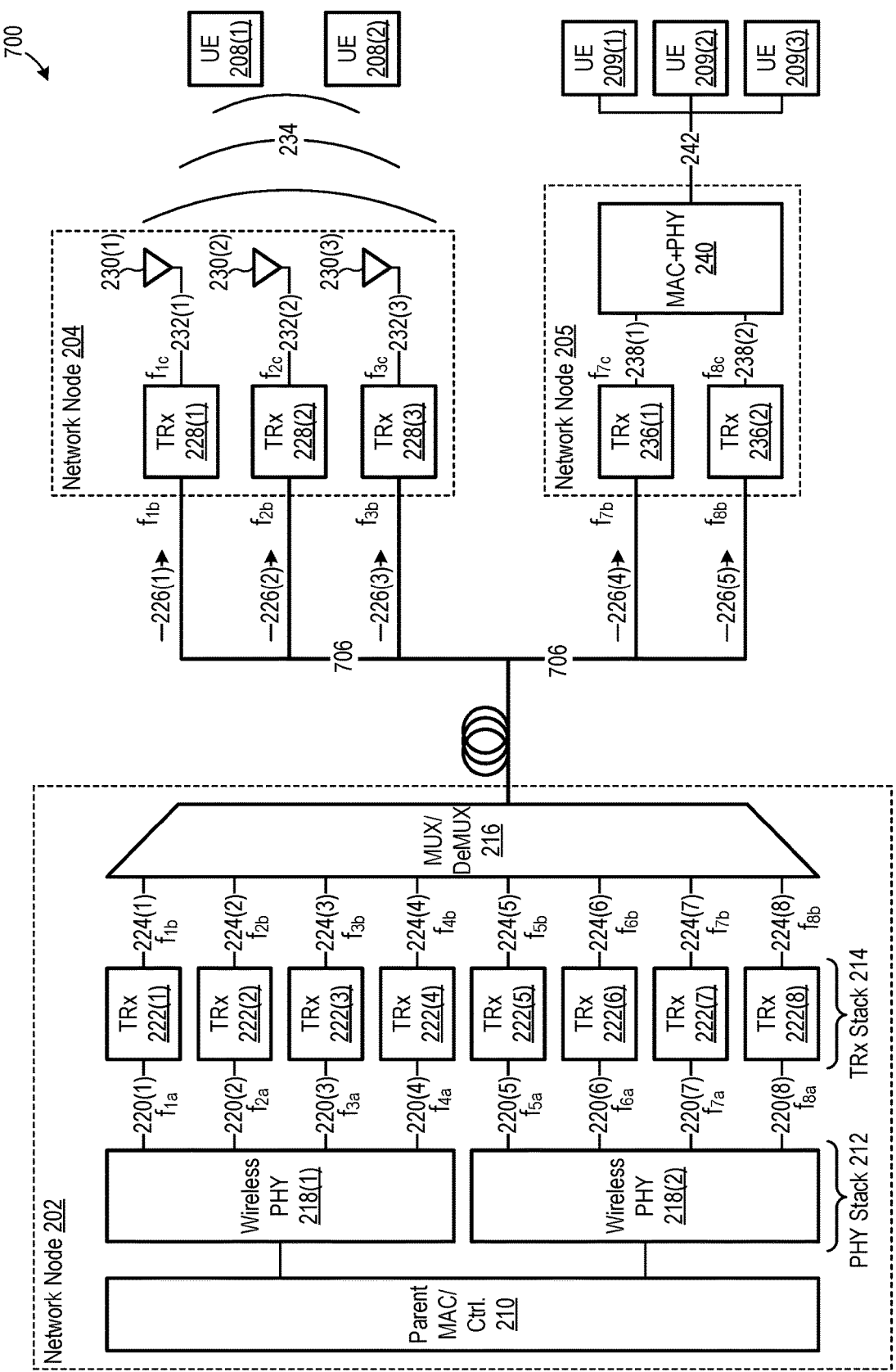
FIG. 7 is a block diagram of an embodiment of the FIG. 2 communication network where wireline communication links are embodied by a cable.

Referring again to FIG. 2, wireline communication link(s) 206 could be embodied by a cable, such as an electrical cable and/or an optical cable. For example, FIG. 7 is a block diagram of a communication network 700, which is an embodiment of communication network 200 where wireline communication links 206 are embodied by a cable 706. Cable 706 is, for example, a coaxial electrical cable, a twisted pair electrical cable (e.g., an Ethernet electrical cable or a telephone electrical cable), a power line electrical cable, or an optical cable. Additionally, cable 706 could include two or more segments of different cable types. For example, a first segment of cable 706 could be formed of optical cable, and a second segment of cable 706 could be formed of electrical cable (e.g., coaxial electrical cable, twisted pair electrical cable, or power line electrical cable). Each of logical wireline communication links 226(1)-226(5) is implemented by a common cable, i.e., cable 706, in communication network 700.

Figure 8:
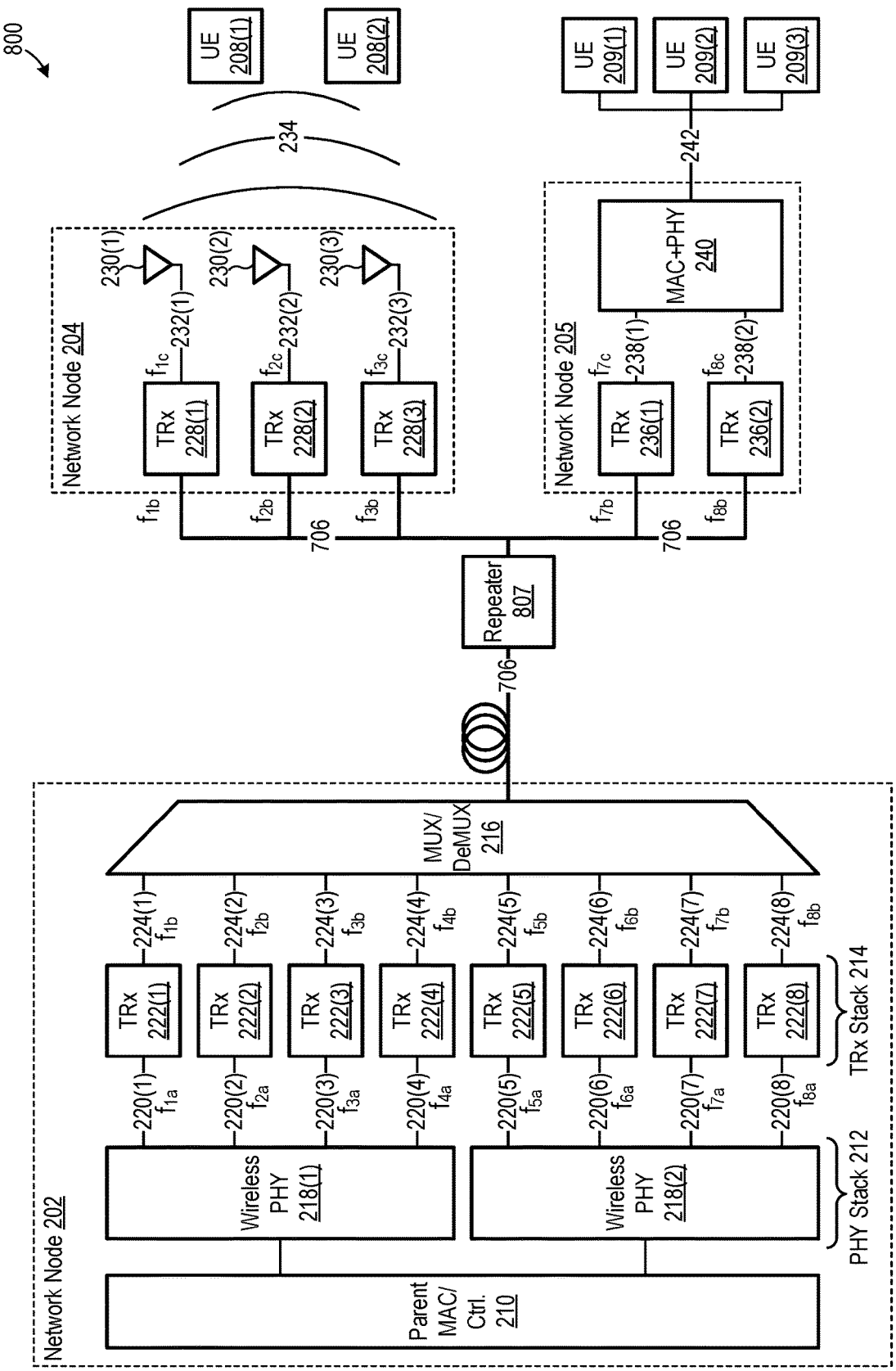
FIG. 8 is a block diagram of an alternate embodiment of the FIG. 7 communication network including a repeater.

Wireline communication links 206 could include active and/or passive interface devices as well as electrical cable and/or optical cable. For example, FIG. 8 is a block diagram of a communication network 800, which is an alternate embodiment of communication network 700 of FIG. 7 further including a repeater 807 connected in series with cable 706 between parent network node 202 and child network nodes 204 and 205. Repeater 807 is configured to receive and regenerate communication signals being transmitted between parent network node 202 and child node 204 or 205. Thus, repeater 807 effectively amplifies communication signals on cable 706. However, in contrast to a conventional amplifier, repeater does not amplify noise on cable 706, thereby helping eliminate cascading noise on cable 706. Some embodiments of repeater 807 are full-duplex repeaters, i.e., they are capable of receiving and regenerating communication signals traveling in either direction on cable 706. Examples of other interface devices that could be included along cable 706 include, but are not limited to, fiber nodes, remote terminals, amplifiers, splitters, taps, and power inserters.

Figure 9:
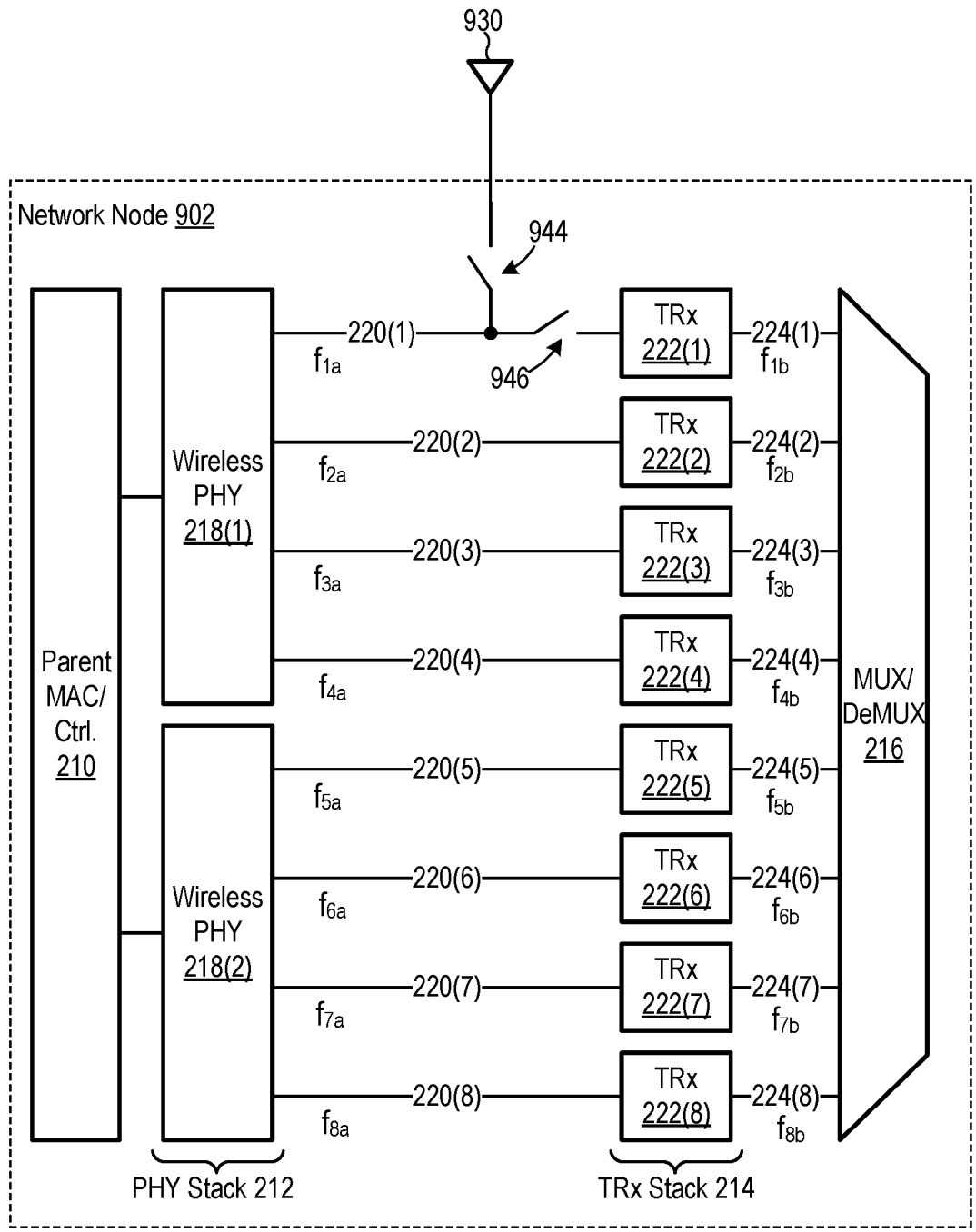
FIG. 9 is a block diagram of an alternate embodiment of a parent network node of the FIG. 2 communication network that is capable of serving as a wireless access point.

Referring again to FIG. 2, parent network node 202 could be modified to include a respective antenna communicatively coupled to one or more PHY channels 220, so that parent network node 202 is capable of acting as a wireless access point, as well as being capable of supporting child network nodes. It may be desirable for parent network node 202 to serve as a wireless access point, for example, to provide public and/or private wireless communication service in the vicinity of parent network node 202. FIG. 9 is a block diagram of a parent network node 902, which is one example of how parent network node 202 could be modified to include an antenna. Parent network node 902 of FIG. 9 differs from parent network node 202 of FIG. 2 in that parent network node 902 further includes an antenna 930, a switch 944, and a switch 946. Switches 944 and 946 are configured to selectably connect PHY channel 220(1) to either antenna 930 or TRx 222(1). In particular, PHY channel 220(1) is communicatively coupled to antenna 930 when switch 944 is closed and switch 946 is open, and PHY channel 220(1) is communicatively coupled to TRx 222(1) when switch 944 is open and switch 946 is closed. In some alternate embodiments, antenna 930 is permanently communicatively coupled to PHY channel 220(1), and switch 944, switch 946, and TRx 222(1) are accordingly omitted. Parent network node 902 could be modified to include respective antennas communicatively coupled to one or more additional PHY channels 220.

Figure 10:
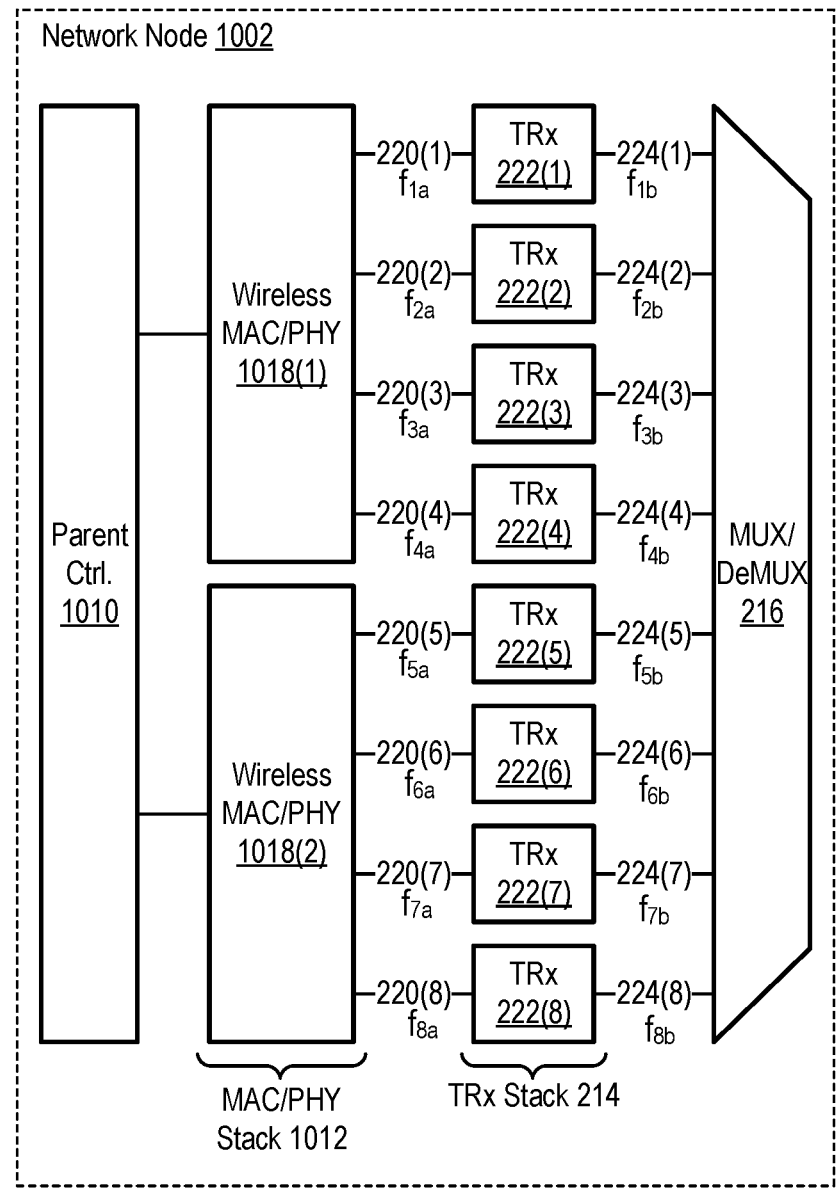
FIG. 10 is a block diagram of an alternate embodiment of a parent network node of the FIG. 2 communication network where a single element provides both medium access control sublayer functionality and physical layer functionality.

FIG. 10 is a block diagram of a parent network node 1002, which is another alternate embodiment of parent network node 202. Parent network node 1002 includes a MAC/PHY stack 1012 in place of PHY stack 212. MAC/PHY stack 1012 includes a plurality of wireless MAC/PHY subsystems 1018. Wireless MAC/PHY subsystems 1018 are similar to wireless PHY subsystems 218, but wireless MAC/PHY subsystems 1018 further include MAC sublayer functionality. Parent MAC/controller 210 of FIG. 10 is accordingly replaced with a parent controller 1010, which lacks MAC sublayer functionality. Parent controller 1010, however, is configured to control aspects of parent node 1002, such as to coordinate frequency ranges of communication signals on transmission channels 224, control parameters of wireless MAC/PHY subsystems 218, and/or allocate PHY channels 220 among child network nodes.

Referring again to FIG. 2, the fact that communication signals are transmitted via wireline communication links in communication network 200 helps minimize the possibility that the communication signals will be subjected to interference. Applicant has found that this relatively interference-free environment of communication network 200 can be exploited to achieve significant advantages. Specifically, certain embodiments of communication network 200 include one or more custom MAC sublayers that are customized for the low-interference environment of wireline communication link(s) 206, and the custom MAC sublayers may therefore achieve higher performance than conventional MAC sublayers. For example, some MAC sublayer embodiments are configured to (a) transmit data without delays and distance limitations associated with acknowledgement messages, (b) transmit data on a shared communication medium without performing a listen-before-talk (LBT) procedure, (c) register a network device without broadcasting conventional, high-overhead beacon frames, and/or (d) allocate different respective PHY channels for downlink and uplink data transmission, as discussed below.

These new MAC sublayers could be implemented, for example, in parent MAC/controller 210 of parent network node 202, in MAC+PHY 240 of child network node 205, and/or in wireless MAC/PHY subsystems 1018 of parent network node 1002. However, the new MAC sublayers are not limited to these applications and could instead be implemented in essentially any communication network operating in a low-interference environment, irrespective of whether the data transmission is wireline or wireless. For example, the new MAC sublayers could be implemented in a wireless communication network that achieves a low interference environment through its location (e.g., in a rural area or in a structure with shielding to prevent entry of electromagnetic waves), by operating in otherwise unused radio frequency spectrum, and/or by use of directional antennas. Additionally, it is understood that MAC sublayers of the embodiment of FIGS. 2-10 are not limited to these MAC sublayers. Instead, the MAC sublayers of the embodiment of FIGS. 2-10 could be essentially any MAC sublayers, both conventional and new, capable of supporting a wireless data transmission protocol.

Efficient Data Transfer

Figure 11:
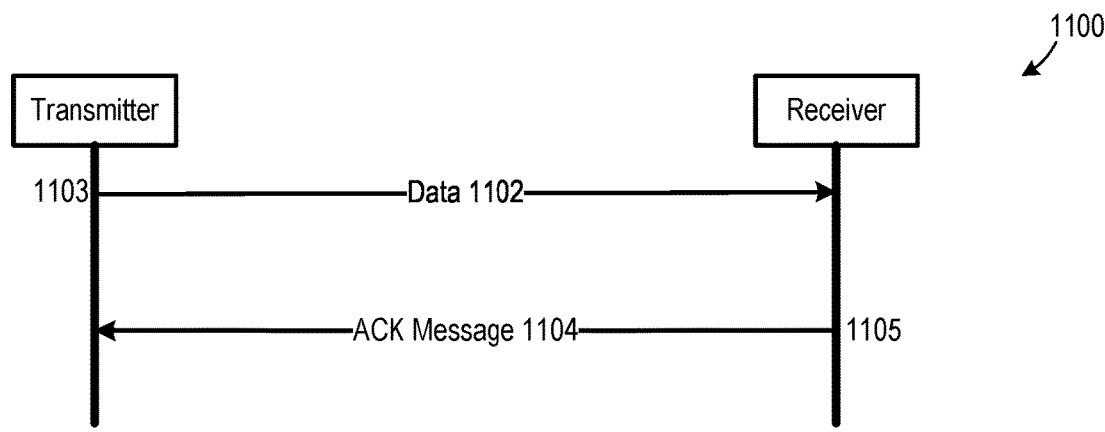
FIG. 11 is a dataflow diagram illustrating an example of data transmission using an acknowledgement message.
Figure 12:
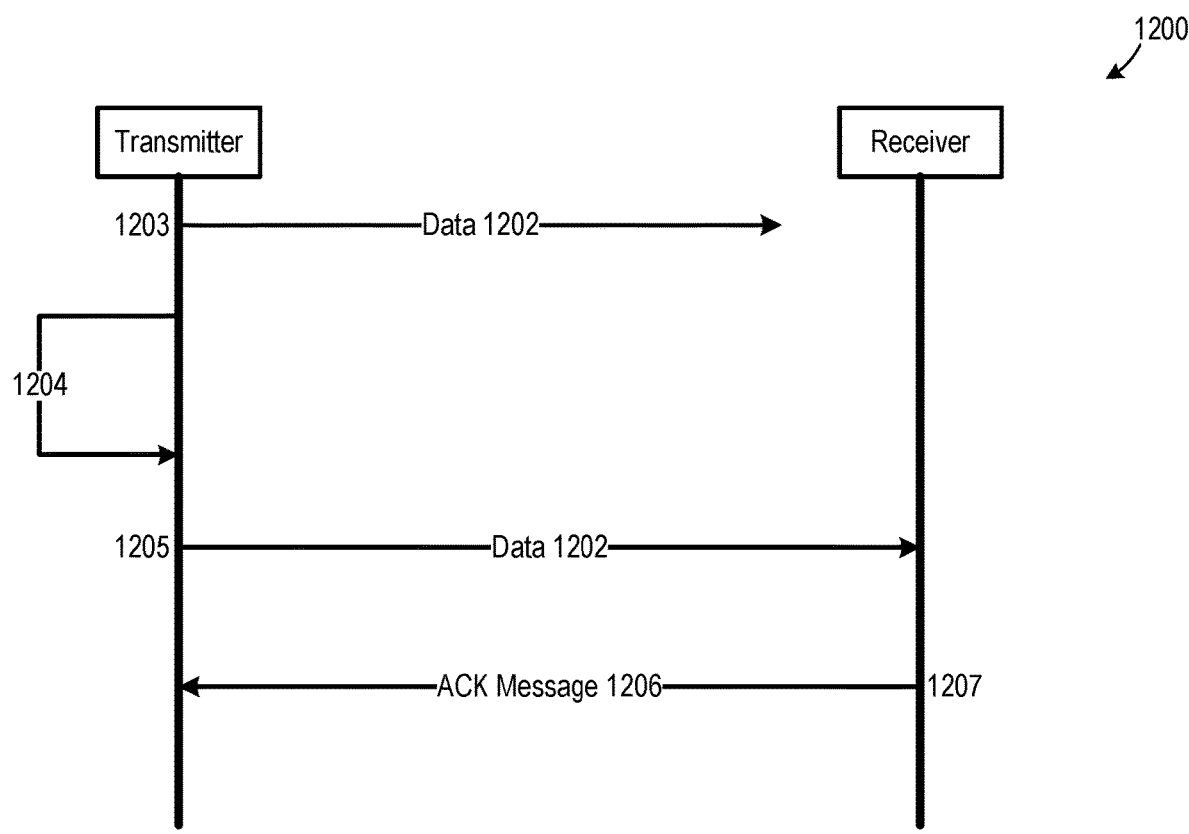
FIG. 12 is a dataflow diagram illustrating another example of data transmission using an acknowledgement message.
Figure 13:
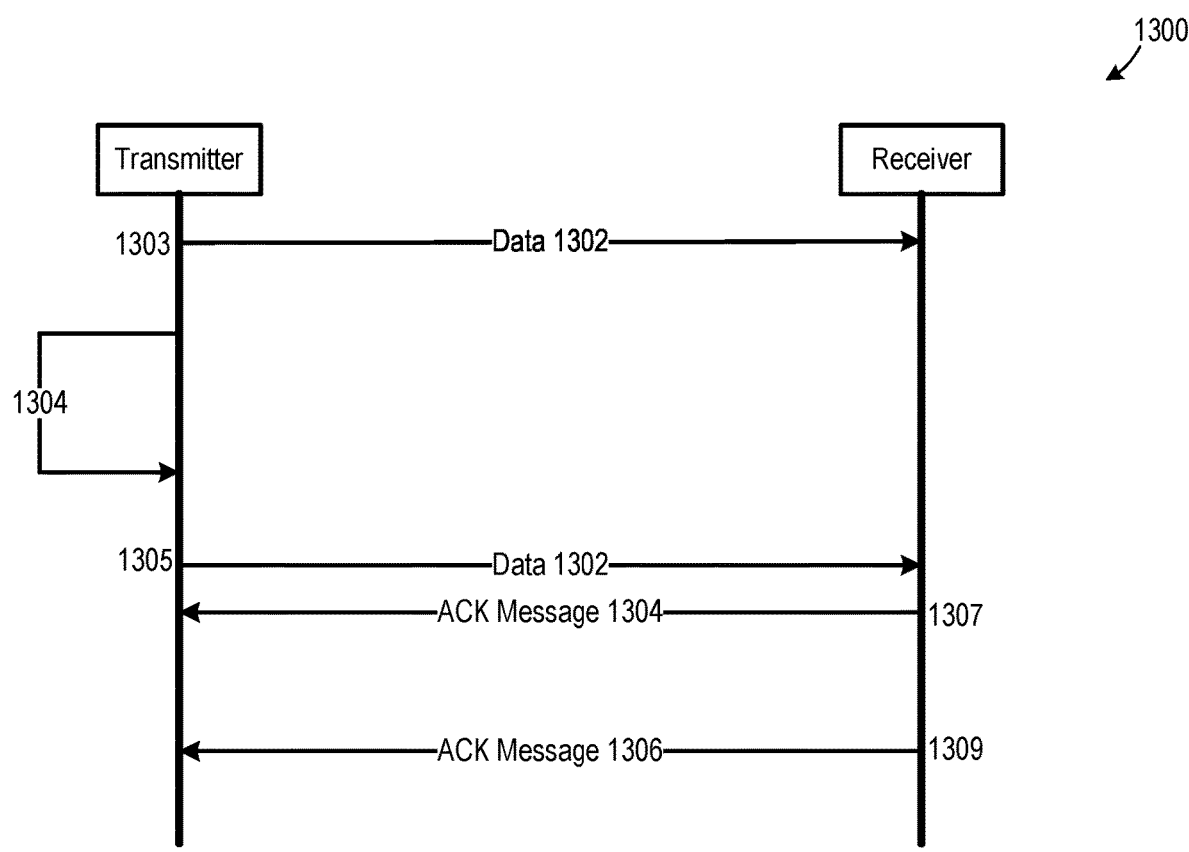
FIG. 13 is a dataflow diagram illustrating another example of data transmission using an acknowledgement message.

Conventional wireless data transmission protocols require that a receiver acknowledge receipt of data sent by a transmitter. The transmitter will resend the data if the transmitter does not receive an acknowledgement (ACK) message within a predetermined amount of time, henceforth referred to as timeout period. Each of FIGS. 11-13 is a dataflow diagram illustrating an example of data transfer with ACK messages. Each of these figures includes a vertical line logically representing a transmitter and a vertical line logically representing a receiver. FIG. 11 is a dataflow diagram 1100 illustrating successful transfer of data. The transmitter successfully sends data 1102 to the receiver at a time 1103, and the receiver responds by sending an ACK message 1104 to the transmitter at time 1105. FIG. 12 is a dataflow diagram illustrating initial unsuccessful transfer of data. The transmitter sends data 1202 to the receiver at time 1203, but the receiver does not receive the data. The transmitter waits a timeout period 1204 for an ACK message, but the transmitter does not receive an ACK message during timeout period 1204. In response, the transmitter resends data 1202 to the receiver at time 1205. The receiver subsequently responds to receipt of data 1202 by sending an ACK message 1206 to the transmitter at time 1207.

FIG. 13 is a dataflow diagram 1300 illustrating transfer of data with a delayed ACK message. The transmitter successfully sends data 1302 to the receiver at a time 1303. The receiver responds by sending an ACK message 1304 to the transmitter, but the ACK message is delayed until time 1307. Accordingly, the transmitter resends data 1302 at time 1305 in response to not receiving an ACK message during timeout period 1304. The receiver subsequently sends ACK message 1306 at time 1309 acknowledging the second receipt of data 1302.

While use of ACK messages helps ensure successful data transfer, use of ACK messages slows data transfer, as evident from the scenarios of FIGS. 11-13. In the FIG. 11 scenario, the transmitter waits for ACK message 1104 before proceeding with further data transmission. Additionally, in the FIG. 12 scenario, further data transmission is delayed by both timeout period 1204 and time required to receive ACK message 1206. Furthermore, additional data transfer is delayed in the FIG. 13 scenario by both timeout period 1304 as well as time required to receive ACK message 1306. Moreover, data 1302 is unnecessarily transmitted twice in the FIG. 13 scenario. Transmission of ACK messages also undesirably consume communication link bandwidth.

Applicant has determined that data can often be reliably transmitted without use of ACK messages in low interference environments and/or in environments where network nodes are stationary. For example, an unsuccessful data transfer, such as illustrated in the FIG. 12 scenario, may be unlikely to occur in the low interference and stationary environment of wireline communication links 206 of communication network 200. Additionally, use of ACK messages may limit length of data transmission communication mediums, such as length of wireline communication links 206. For example, assume that a timeout period, such as timeout period 1204 or 1304 of FIGS. 12 and 13, respectively, is 15 microseconds. Such timeout period would limit length of wireline communication links to a length that communication signals can traverse in less than 15 microseconds, to prevent erroneous timeout delays.

Figure 14:
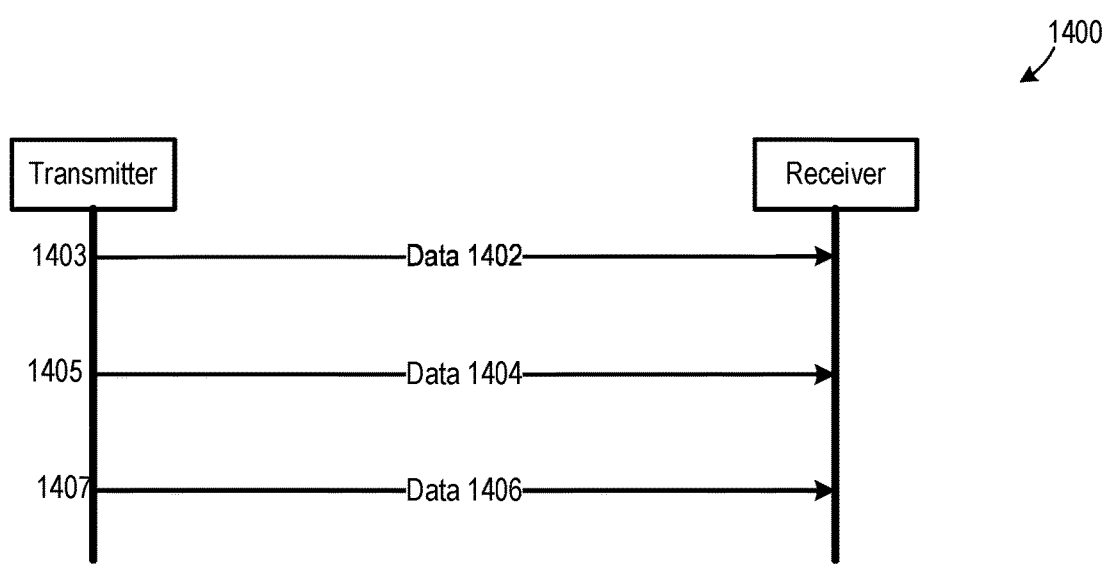
FIG. 14 is a dataflow diagram illustrating one example of data transmission without using an acknowledgement message, according to an embodiment.

Consequently, certain embodiments of the new MAC sublayers are configured to transmit data without use of ACK signals, such that data is sent from one network node to another network node without waiting for acknowledgement signals from the other network node. For example, FIG. 14 is dataflow diagram 1400 illustrating one example of data transmission without using ACK messages. FIG. 14 includes a vertical line logically representing a transmitter and a vertical line logically representing a receiver. In some embodiments, the transmitter is parent network node 202, and the receiver is child network node 204 or 205. In some other embodiments, the transmitter is either child network node 204 or 205, and the receiver is parent network node 202. The transmitter sends data 1402 to the receiver at time 1403. In contrast to conventional data transmission techniques, the transmitter does not wait for an ACK message before sending additional data. Instead, the transmitter sends data 1404 to receiver at time 1405 without receiving an ACK message. Similarly, the transmitter sends data 1406 to the receiver at time 1407 without receiving an ACK message associated with data 1404.

Transmission of data without using ACK messages advantageously eliminates delays associated with waiting for the messages, as well as delays associated with timeout periods, thereby helping achieve efficient use of a communication medium. Additionally, transmission of data without using ACK messages eliminates communication medium length limitations imposed by timeout periods. Furthermore, transmission of data without using ACK messages eliminates need to use communication link bandwidth for ACK messages, thereby further promoting data transmission efficiency.

Scheduled Data Transmission

Communication networks using a shared communication medium conventionally use a LBT procedure to minimize collisions from two or more network nodes trying to use the communication medium at the same time. A network node sending data according to a LBT procedure checks if the communication medium is free before sending the data, and the network node only sends data once the communication link is free. In the event that two or more data transmissions nevertheless occur at the same time, all transmitting network nodes cease transmission and wait a random amount of time, sometimes referred to as backoff time, before attempting to resend their respective data.

Figure 15:
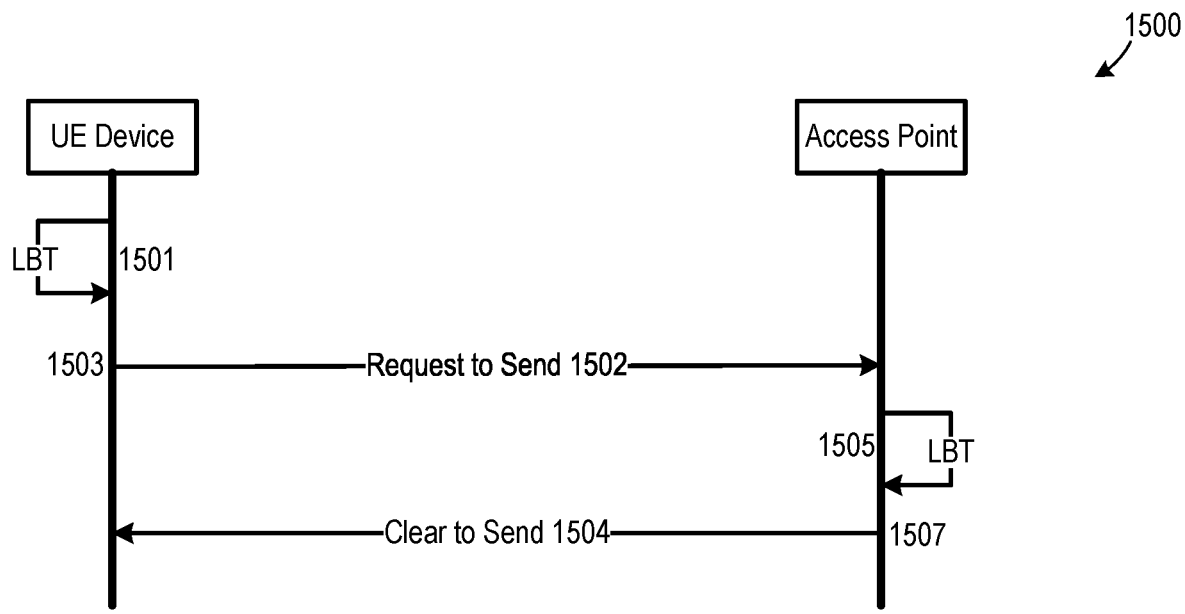
FIG. 15 is a dataflow diagram illustrating an example of data transmission in a Wi-Fi context where an access point manages airtime usage.

FIG. 15 is a dataflow diagram illustrating an example of data transmission in a Wi-Fi context where an access point manages airtime usage. FIG. 15 includes a vertical line logically representing a UE device (e.g., a Wi-Fi station) and a vertical line logically representing a Wi-Fi wireless access point. The UE device performs a LBT procedure at time 1501 to determine whether a shared wireless channel is clear. Once the shared wireless channel is clear, the UE device sends a request to send message 1502 to the wireless access point at time 1503, where request to send message 1502 is a request by the UE device to send data over the shared wireless channel. The access point accepts request 1502, and the access point accordingly performs a LBT procedure at time 1505 to determine whether the shared wireless channel is clear. Once the shared wireless channel is clear, the access point sends a clear to send message 1504 to the UE device at time 1507.

The airtime management process illustrated in FIG. 15 may cause interference and reduce communication network performance. For example, two or more devices may send messages, such as request to send messages 1502, at the same time, causing interference and thereby necessitating that all transmitting devices cease transmission and wait a random backoff time before attempting to resend their respective data.

Certain embodiments of the new MAC sublayers are advantageously configured to transmit data without using a LBT procedure. Additionally, particular embodiments of the new MAC sublayers are configured to transmit data without transmitting random access flow control messages. In these embodiments, a MAC sublayer, such as the MAC sublayer of parent MAC/controller 210, coordinates sharing of a common communication medium, such as wireline communication link(s) 206, by multiple network nodes (e.g., child network nodes 204 and 205), using a scheduling procedure. Consequently, overhead associate with LBT procedures can be eliminated. Additionally, random access flow control messages, such as request to send messages and clear to send messages, can also be eliminated, thereby eliminating possibility of such messages colliding. Such scheduling can be implemented with a wireless data protocol that does not support scheduling by use of certain embodiments of the new MAC sublayers disclosed herein. For example, some embodiments of the new MAC sublayers add scheduling capability to Wi-Fi data transmission protocols that do not natively support scheduling, thereby potentially significantly improving performance of a communication system using these data transmission protocols.

Figure 16:
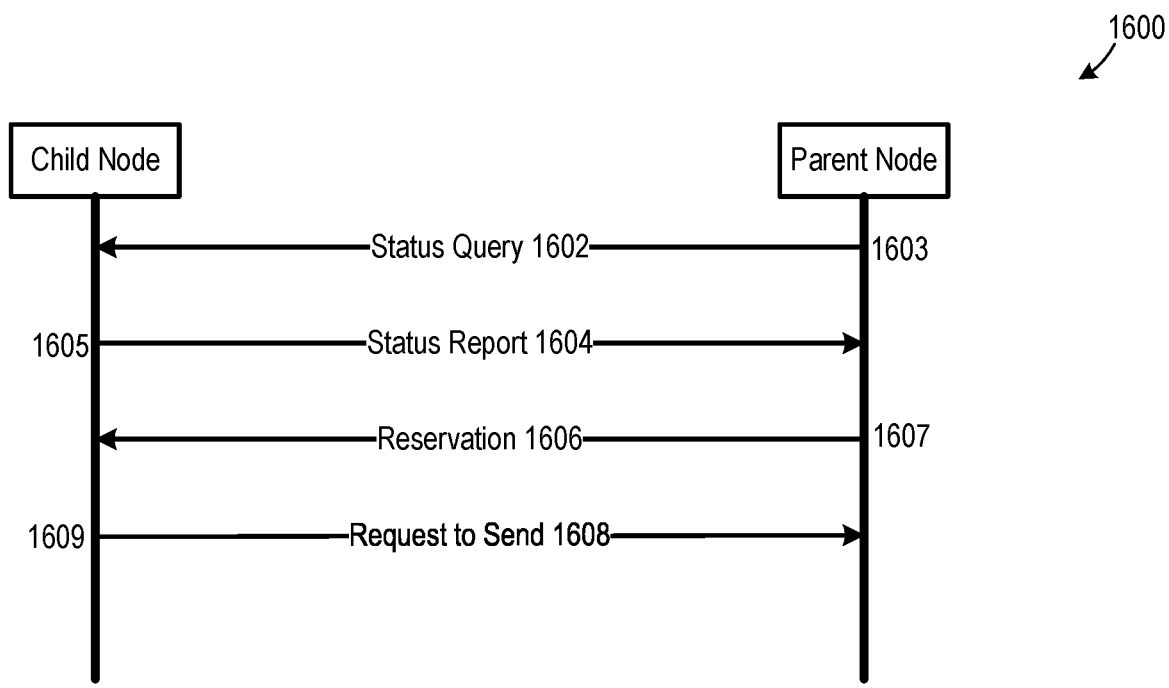
FIG. 16 is a dataflow diagram illustrating one example of data transmission using a scheduling procedure, according to an embodiment.

FIG. 16 is a dataflow diagram illustrating one example of data transmission using a scheduling procedure. FIG. 16 includes a vertical line logically representing a child network node (e.g., child network node 2504 or 205) and a vertical line logically representing a parent network node (e.g., parent network node 202). The parent network node sends a status query 1602 to the child network node at time 1603. The status query asks, for example, whether the child network node has data to send and/or what amount of data the child network node has to send. Examples of status query 1602 include, but are not limited to, a bandwidth query report poll or a request for a buffer status report. The child node responds to status query 1602 by sending a status report to the parent node at time 1605. The status report indicates, for example, that the child node has data to send and/or how much data the child node has to send. In some embodiments, status report 1604 includes a buffer status report or a bandwidth report. The parent network node responds to status report 1604 by sending a reservation 1606 to the child node at time 1607. Reservation 1606 includes a grant of communication medium resources, such as a specific transmission time and/or a specific transmission frequency range, that the child node may use to send data to another network node. The child network node responds to reservation 1606 by sending data 1608 to the parent network node at time 1609 in accordance with reservation 1606.

Efficient Network Device Registration

Figure 17:
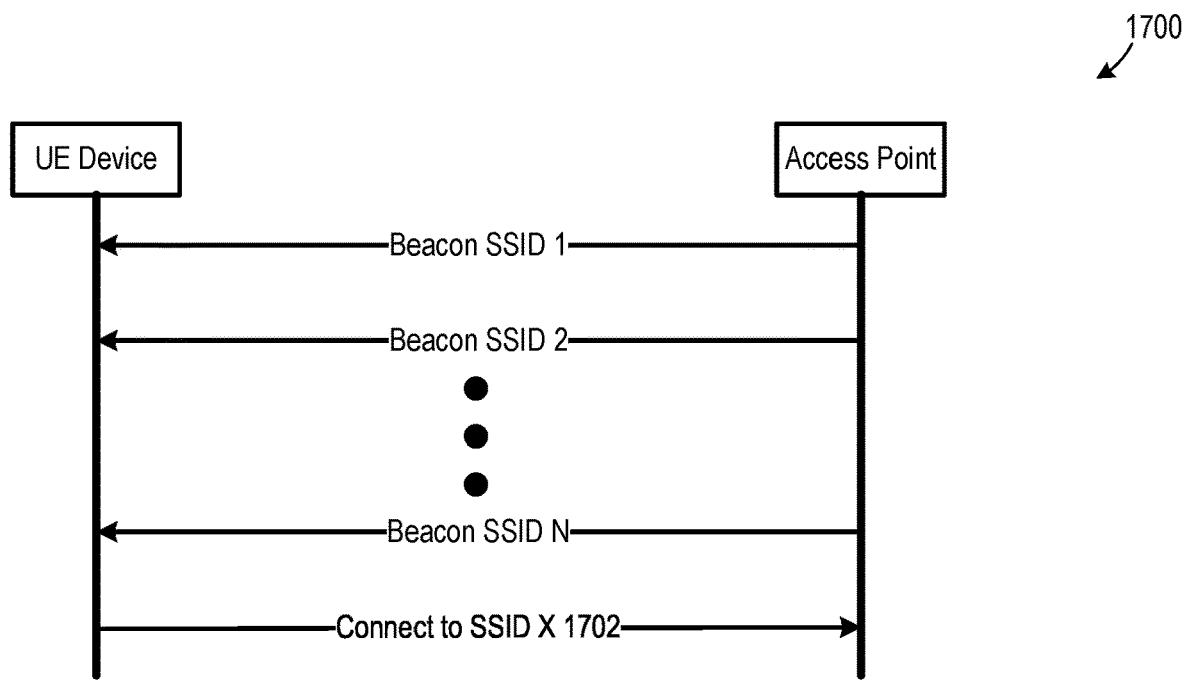
FIG. 17 is a dataflow diagram illustrating one example of use of service set identifiers in a Wi-Fi wireless communication network.

Wireless communication networks conventionally broadcast beacons notifying UE devices of available wireless communication networks and providing information needed to connect to the wireless communication networks. For example, conventional Wi-Fi networks broadcast beacons in the form of "service set identifiers" (SSIDs). FIG. 17 is a dataflow diagram 1700 illustrating one example of use of SSIDs in a conventional Wi-Fi wireless communication network. FIG. 17 includes a vertical line logically representing a UE device (e.g., a Wi-Fi station) and a vertical line logically representing a Wi-Fi wireless access point. The access point broadcasts N SSID beacons, where N is an integer greater than or equal to one on the channel being used by that SSID. Each SSID beacon represents a respective wireless communication network supported by the wireless access point. The UE device listens for all N SSID beacons on each possible channel, and the UE device selects one of the wireless communication networks on a specific channel corresponding to SSID X, where X is one of the values of N. The UE device subsequently sends a connect to SSID X message 1702, and the access point commences registration of the UE device on the wireless communication network corresponding to SSID X.

Conventional wireless communication network identification beacons, such as the Wi-Fi SSID beacons discussed above with respect to FIG. 17, typically contain a significant amount data. Consequently, broadcasting of conventional wireless communication network identification beacons consumes significant network resources. For example, transmission of each SSID beacon in a Wi-Fi wireless communication network consumes approximately three percent of the network's resources. Wi-Fi wireless communication networks frequently need to broadcast a plurality of SSID beacons, and SSID beacon broadcasting may therefore come a significant portion of a Wi-Fi wireless communication network's resources.

Applicant has determined that it may not be necessary to notify network nodes of available networks, or to distinguish between available networks, in a controlled radio frequency environment, such as in wireline communication network 200 of FIG. 2. Accordingly, certain embodiments of the new MAC sublayers are advantageously configured to register network devices to a network without broadcasting SSID beacons or similar beacons. Instead, a parent network node broadcasts reservation messages from time-to-time (e.g., periodically), where the reservation messages identify a time and frequency that a child network node may use to transmit a request to join the network.

In certain embodiments, the reservation messages are significantly smaller than SSID beacons. For example, some embodiments of the reservation messages do not differentiate between available networks. As another example, some embodiments of the reservation messages do not provide a technical description of a network-instead, the reservation messages solely identify a time and frequency that a child network node may use to transmit a request to join the network. Reservation messages could include downstream, and upstream channel configurations, cryptography schemes and other information relevant to the network connectivity and security. Registration messages can be sent at higher modulate rate than conventional SSID beacons to enable faster connections for UE devices and to save bandwidth and air time. Consequently, broadcasting of reservation messages may consume significantly less network resources than broadcasting SSID beacons. Number of available channels where a registration message can be sent can be limited. By limiting the downstream channel to N channels, where N is an Integer greater than or equal to 1, that broadcast the registration message, time required to register a new device can be reduced. Indeed, Applicant has estimated that broadcasting registration messages may consume only between 0.1 to 1.0 percent of communication network resources. It should be noted, however, that reservation messages can include additional information without departing from the scope hereof. For example, in certain embodiments, the registration messages further include information for authenticating a network device on the communication network. Inclusion of additional information in registration messages may expedite network device registration, with the drawback of increased registration message size and associated network overhead.

Figure 18:
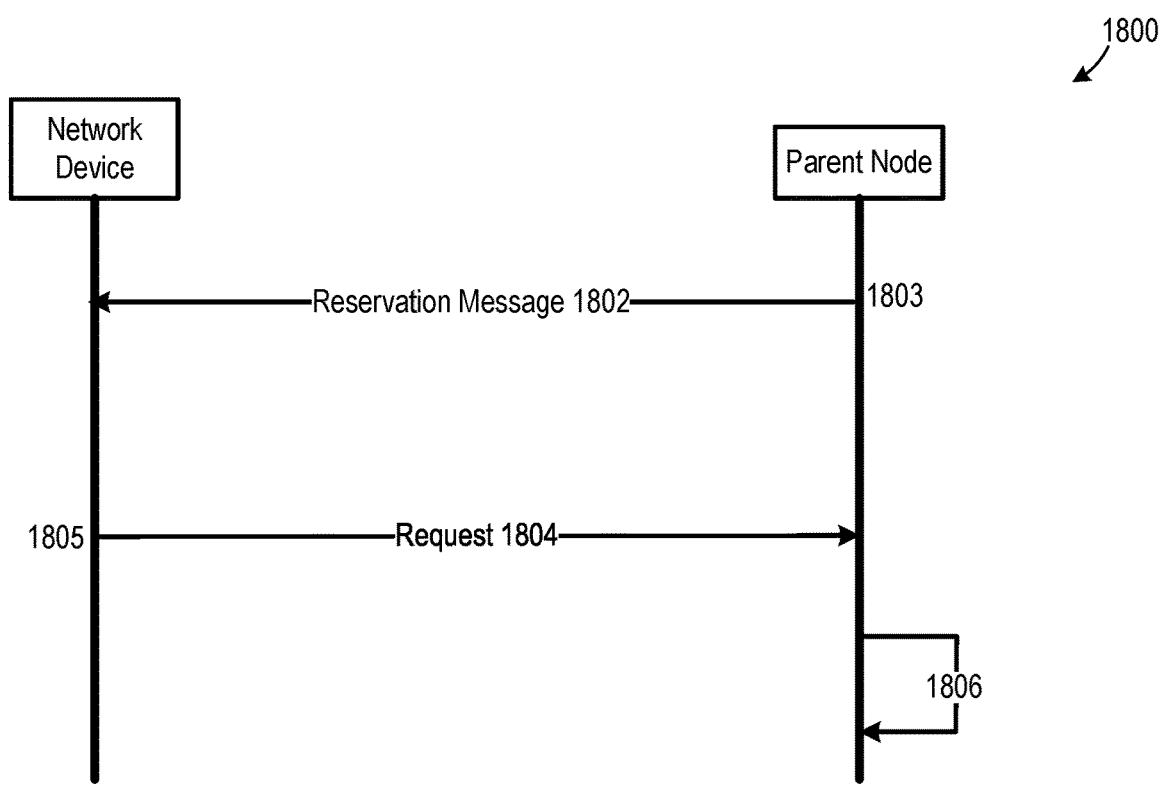
FIG. 18 is a dataflow diagram illustrating one example of registering a network device with a communication network using a registration message, according to an embodiment.

FIG. 18 is dataflow diagram of one example of registering a network device with a communication network using a registration message. FIG. 18 includes a vertical line logically representing a network device (e.g., child network node 204 or 205) wanting to connect to a communication network (e.g., communication network 200). FIG. 18 further includes a vertical line logically representing a parent network node (e.g., parent network node 202 of communication network 200) that is operating according to a wireless data transmission protocol (e.g., a Wi-Fi data transmission protocol, a cellular data transmission protocol, a Bluetooth data transmission protocol, a satellite data transmission protocol, etc.). The parent network node broadcasts a reservation message at a time 1803, where the registration message identifies a time and a frequency that a network device may use to transmit a request to the parent network node to join its communication network. For example, in embodiments where method 1800 is implemented in communication network 200, parent network node 202 broadcasts reservation message 1802 to child network devices 204 and 205 via wireline communication link(s) 206. The network device receives reservation messages 1802, and the network device decides that it wishes to join the communication network of the parent node. Accordingly, at a time 1805, the network device sends a request 1804 to the parent network node to join the communication network. As one example, client device 205 may send to parent node 202 a request to join wireline communication network 200. In response to receiving request 1804, the parent network node initiates 1806 registration of the network device with the communication network.

Dedicated Downlink and Uplink PHY Channels

Many communication networks use a common PHY channel for transmitting both downlink and uplink data. For example, a Wi-Fi wireless communication network may use a single wireless communication channel to transmit both downlink and uplink data. Use of a common channel for both downlink and uplink data transmission, however, may result in collision of downlink and uplink data packets. Accordingly, certain embodiments of the new MAC sublayers are advantageously configured to dedicate respective PHY channels for downlink and uplink data transmission (e.g., as discussed above with respect to FIG. 4), thereby eliminating the possibility of a collision between downlink and uplink data packets. Additionally, having dedicated downlink and uplink channels helps enable use of a shared communication medium without requiring LBT procedures.

Combinations of Features

Features described above may be combined in various ways without departing from the scope hereof. The following examples illustrate some possible combinations.

(A1) A method for wireline data transmission includes (1) at a parent network node, generating first communication signals within a first frequency range, the first communication signals complying with a wireless data transmission protocol, (2) shifting frequency of the first communication signals from being within the first frequency range to being within a second frequency range, and (3) after shifting frequency of the first communication signals, sending the first communication signals from the parent network node to a first child network node via a first wireline communication link communicatively coupling the parent network node and the first child network node.

(A2) The method denoted as (A1) may further include (1) at the parent network node, generating second communication signals within a third frequency range, the second communication signals complying with the wireless data transmission protocol, (2) shifting frequency of the second communication signals from being within the third frequency range to being within a fourth frequency range, and (3) after shifting frequency of the second communication signals, sending the second communication signals from the parent network node to a second child network node via a second wireline communication link communicatively coupling the parent network node and the second child network node.

(A3) In the method denoted as (A2), the fourth frequency range may be different from the second frequency range.

(A4) In any one of the methods denoted as (A2) and (A3), the third frequency range may be the same as the first frequency range.

(A5) In any one of the methods denoted as (A2) through (A4), the first and second wireline communication links may be at least partially embodied by a common physical cable.

(A6) The method denoted as (A5) may further include coupling the first and second communication signals onto the common physical cable using a multiplexor/de-multiplexor or a power combiner/splitter.

(A7) In any one of the methods denoted as (A1) through (A6), sending the first communication signals from the parent network node to the first child network node may include sending the first communication signals from the parent network node to the first child network node without waiting for acknowledgment signals from the child network node.

(A8) In any one of the methods denoted as (A1) through (A7), sending the first communication signals from the parent network node to the first child network node may include sending the first communication signals from the parent network node to the first child network node according to a schedule and without performing a listen-before-talk procedure.

(A9) In any one of the methods denoted as (A1) through (A8), the wireless data transmission protocol may be a Wi-Fi wireless data transmission protocol.

(A10) In any one of the methods denoted as (A1) through (A8), the wireless data transmission protocol may be a cellular wireless data transmission protocol.

(B1) A method for wireline data transmission includes (1) at a parent network node, generating first communication signals within a first frequency range, the first communication signals complying with a first wireless data transmission protocol, (2) shifting frequency of the first communication signals from being within the first frequency range to being within a second frequency range, (3) after shifting frequency of the first communication signals, transmitting the first communication signals from the parent network node to a first child network node via a first wireline communication link communicatively coupling the parent network node and the first child network node, and (4) at the first child network node, shifting frequency of the first communication signals from being within the second frequency range to being within a third frequency range.

(B2) In the method denoted as (B1), the first child network node may include customer premises equipment.

(B3) Any one of the methods denoted as (B1) and (B2) may further include, at the first child network node, converting the first communication signals from one of an electrical domain and an optical domain to a radio-frequency wireless domain using one or more antennas at the first child network node (B4) Any one of the methods denoted as (B1) and (B2) may further include, at the first child network node, converting the first communication signals from the first wireless data transmission protocol to a second data transmission protocol that is different from the first wireless data transmission protocol.

(B5) In the method denoted as (B4), the second data transmission protocol may be an Institute of Electrical and Electronics Engineers (IEEE) 802.3-based data transmission protocol.

(B6) In any one of the methods denoted as (B1) through (B5), transmitting the first communication signals from the parent network node to the first child network node via the first wireline communication link may include transmitting the first communication signals through the first wireline communication link in one or more of an electrical domain and an optical domain.

(B7) Any one of the methods denoted as (B1) through (B6) may further include (1) at the parent network node, generating second communication signals within a fourth frequency range, the second communication signals complying with the first wireless data transmission protocol, (2) shifting frequency of the second communication signals from being within the fourth frequency range to being within a fifth frequency range, (3) transmitting the second communication signals from the parent network node to a second child network node via a second wireline communication link communicatively coupling the parent network node and the second child network node, and (4) at the second child network node, shifting frequency of the second communication signals from being within the fifth frequency range to being within a sixth frequency range.

(B8) In the method denoted as (B7), the fifth frequency range may be different from the second frequency range.

(B9) In any one of the methods denoted as (B7) and (B8), each of the first and second wireline communication links may be at least partially embodied by a common physical cable.

(B10) Any one of the methods denoted as (B1) through (B6) may further include (1) at the first child network node, generating second communication signals within a fourth frequency range, the second communication signals complying with the first wireless data transmission protocol, (2) shifting a frequency of the second communication signals from being within the fourth frequency range to being within a fifth frequency range, (3) transmitting the second communication signals from the first child network node to the parent network node via the first wireline communication link, and (4) at the parent network node, shifting frequency of the second communication signals from being within the fifth frequency range to being within a sixth frequency range.

(B11) In the method denoted as (B10), the first communication signals may carry downlink data from the parent network node to the first child network node, and the second communication signals may carry uplink data from the first child network node to the parent network node (B12) Any one of the methods denoted as (B10) and (B11) may further include using a first repeater to (1) regenerate the first communication signals during transmission from the parent network node to the first child network node via the first communication link and (2) regenerate the second communication signals during transmission from the first child network node to the parent network node via the first communication link.

(B13) In any one of the methods denoted as (B1) through (B12), the first wireless data transmission protocol may be a Wi-Fi wireless data transmission protocol.

(B14) In any one of the methods denoted as (B1) through (B12), the first wireless data transmission protocol may be a cellular wireless data transmission protocol.

(C1) A method for registration of a network device with a communication network includes (1) at a first network node operating according to a wireless data transmission protocol, broadcasting a reservation message identifying a first time and a first frequency that a network device may use to transmit a request to the first network node to join the communication network, (2) receiving, at the first network node, a first request from a first network device to join the communication network, and (3) in response to receiving the first request at the first network node, initiating registration of the first network device with the communication network.

(C2) In the method denoted as (C1), the reservation message may include information for authenticating a network device on the communication network.

(C3) In any one of the methods denoted as (C1) and (C2), the wireless data transmission protocol may be a Wi-Fi data transmission protocol.

(C4) In any one of the methods denoted as (C1) and (C2), he wireless data transmission protocol may be a cellular wireless data transmission protocol.

(C5) In any one of the methods denoted as (C1) through (C4), the first network device may be communicatively coupled to the first network node via a wireline communication link, and broadcasting the reservation message may include broadcasting the reservation message via the wireline communication link.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A method for wireline data transmission, the method comprising:
    at a remote PHY device (RPD) of a parent network node, generating a first communication signal stream complying with a Wi-Fi wireless data transmission protocol;
    upconverting the first communication signal stream from a first baseband frequency range to a first radio frequency (RF) frequency range for cable network transmission;
    after upconverting the first communication signal stream, transmitting the first communication signal stream from the RPD of the parent network node to a first customer premises equipment (CPE) of a first child network node via a cable network;
    at the first CPE of the first child network node, shifting frequency of the first communication signal stream; and
    at the first CPE of the first child network node, wireless transmitting the first communication signal stream to at least a first mobile station using one or more antennas at the first CPE of the first child network node;

wherein the first mobile station is communicatively coupled to the parent network node via a direct Wi-Fi connection between the first mobile station and the parent network node.

2. The method of claim 1, further comprising:
at the RPD of the parent network node, generating a second communication signal stream complying with the Wi-Fi wireless data transmission protocol;
upconverting the second communication signal stream from a second baseband frequency range to a second RF frequency range for cable network transmission;
transmitting the second communication signal stream from the RPD to a second CPE of a second child network node via the cable network; and
at the second CPE of the second child network node, shifting frequency of the second communication signal stream.

3. The method of claim 2, wherein the first communication signal stream and the second communication signal stream occupy different respective channels on the cable network.

4. The method of claim 2, further comprising frequency division multiplexing the first and second communication signal streams after upconverting each of the first and second communication signal streams.

5. The method of claim 2, further comprising, at the second CPE of the second child network node, converting the second communication signal stream from the Wi-Fi wireless data transmission protocol to a second data transmission protocol that is different from the Wi-Fi wireless data transmission protocol.

6. The method of claim 5, wherein the second data transmission protocol is an Institute of Electrical and Electronics Engineers (IEEE) 802.3-based data transmission protocol.

7. The method of claim 1, wherein transmitting the first communication signal stream from the RPD of the parent network node to the first CPE of the first child network node via the cable network comprises sending the first communication signal stream from the RPD of the parent network node to the first CPE of the first child network node via the cable network without using acknowledgement messages.

* * * * *